United States Patent [19]

Nasburg

[11] Patent Number: 5,696,503
[45] Date of Patent: Dec. 9, 1997

[54] WIDE AREA TRAFFIC SURVEILLANCE USING A MULTISENSOR TRACKING SYSTEM

[75] Inventor: Robert E. Nasburg, Palos Verdes Estates, Calif.

[73] Assignee: Condition Monitoring Systems, Inc., Long Beach, Calif.

[21] Appl. No.: 96,769

[22] Filed: Jul. 23, 1993

[51] Int. Cl.⁶ ........................................... G08G 1/01
[52] U.S. Cl. .................. 340/933; 340/934; 340/992; 340/994; 364/436; 364/438
[58] Field of Search .................... 340/933, 934, 340/992, 994; 364/436, 438

[56] References Cited

U.S. PATENT DOCUMENTS

| | | | |
|---|---|---|---|
| 4,023,017 | 5/1977 | Ceseri | 364/437 |
| 4,325,057 | 4/1982 | Bishop | 340/539 |
| 4,791,571 | 12/1988 | Takahashi et al. | 364/436 |
| 5,283,573 | 2/1994 | Takatou et al. | 340/934 |
| 5,296,852 | 3/1994 | Rathi | 340/934 |

OTHER PUBLICATIONS

Waters Information Services, Inc. "Hughes says ex–employees stole intellectual property," Jun. 7, 1993, pp. 1, 2, 4, 6.

*Primary Examiner*—Jeffery Hofsass
*Assistant Examiner*—Daryl C. Pope
*Attorney, Agent, or Firm*—Sereboff & Sereboff

[57] ABSTRACT

A wide area surveillance system for application to large road networks is described. The system employs smart sensors to identify plural individual vehicles in the network. These vehicles are tracked on an individual basis, and the system derives the behavior of the vehicle. Furthermore, the system derives traffic behavior on a local basis, across roadway links, and in sections of the network. Processing in the system is divided into multiple processing layers, with geographical separation of tasks.

25 Claims, 23 Drawing Sheets

0 - MultiSensor Advanced Tracking System (MATS)

Context Diagram - MultiSensor Advanced Tracking System

0 - MultiSensor Advanced Tracking System (MATS)

1.1 - Seperated Sensor FOVs Track Node 1.1.1 - Track Node Database Management 1.1.2 - Local Trackng 1.1.2.1 - Local Track Filter 1.1.2.1.1 - Update Tracks 1.1.2.2 - Generate Track Innovations 1.1.3 - External Track Node Interface 1.1.3.3 - Link Time Estimation 1.1.3.3.1 - Link Time Filter 1.1.3.3.2 - Generate Link Time Innovations 1.2 - Overlapping Sensor FOVs Track Node 1.2.2 - Overlapped Local Tracking 1.2.4 - Other Track Node Interface 4 - Analyze Wide Area Flow 4.1 - Analyze Link Flow 1-2

4.4 - Analyze Section Flow 4.4.1 - Section Flow Assessment A

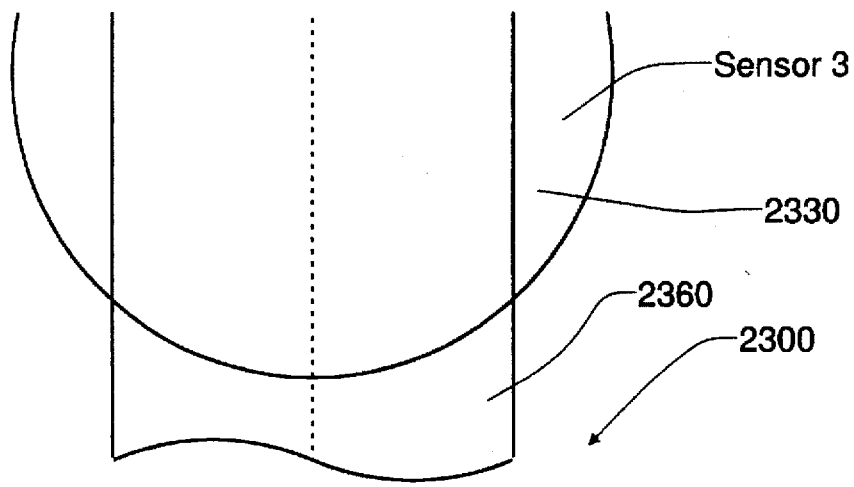
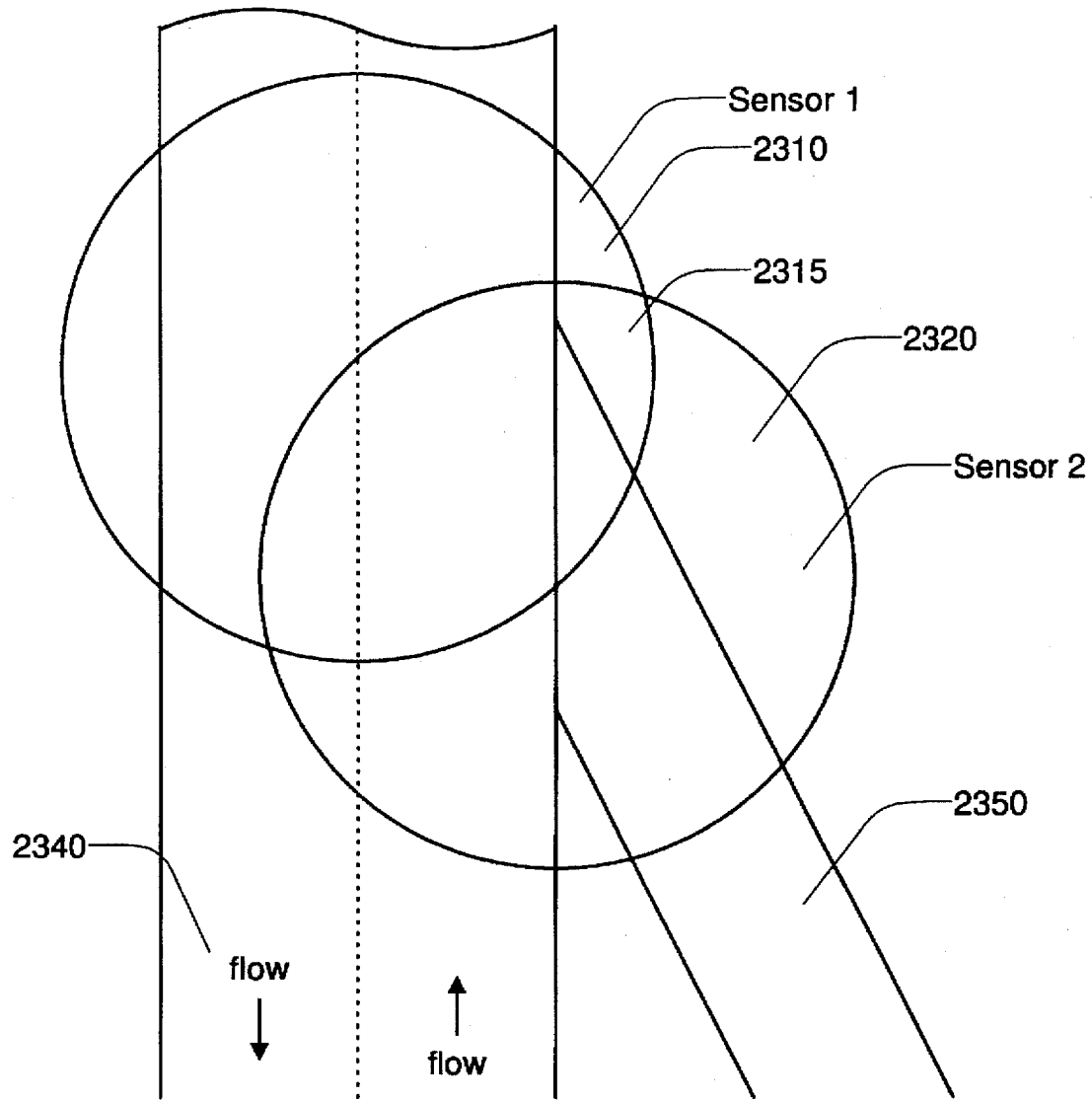
Figure 23

WIDE AREA TRAFFIC SURVEILLANCE USING A MULTISENSOR TRACKING SYSTEM

NOTICE OF COPYRIGHTS AND TRADE DRESS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to traffic surveillance systems.

2. Description of Related Art

Numerous types of sensors for vehicle detection are available which provide information about vehicles in a local area of the roadway. An inductive loop detector is the most prevalent of these due to low cost and maturity of technology, but it typically can only monitor a small area. In practice, a loop is embedded in a lane of a roadway, and the loop magnetically senses when a large mass of metal passes over it. By placing two loops a known distance apart, the speed of a vehicle across the two loops can be measured with limited accuracy. Loops therefore provide vehicle count and speed at a specific point in each lane to the traffic manager. Ten lanes of a freeway typically require ten sets of loops.

Other technologies have been developed to replace loops. These sensors are generally in the testing stage, and include microwave sensors, radar and laser radar sensors, piezoelectric sensors, ultrasonic sensors, and video processor loop replacement (tripwire) sensors. All of these sensors typically detect vehicles in a small area of the roadway network.

Video processor loop replacement sensors, also known as tripwire sensors, simulate inductive loops. With a tripwire sensor, a traffic manager can designate specific small areas within a video camera's field of view. In use, a traffic manager typically electronically places the image of a loop over the roadway video. A video processor determines how many vehicles pass through the designated area by detecting changes within a detection box as a vehicle passes through it. Like inductive loops, multiple tripwire sensors can be placed in each lane, allowing these systems to determine both vehicle counts and speeds.

Tripwire sensors are being integrated experimentally with a tracking capability derived from tracking technology used for missile guidance. These systems continuously track a vehicle detected within the designated area while the vehicle is in the video camera's field of view (FOV).

Inexpensive RF transponders have been developed for use in electronic toll collection systems. When interrogated by an RF reader at the side of a roadway, RF transponders supply a unique identification signal which is fed to a processing station. It is understood that this system detects and identifies a given vehicle as it enters a toll area. After a vehicle is identified, the vehicle owner is debited for the proper amount of toll automatically.

Another technology being proposed for automated toll collection is the use of image processors to perform automated license plate reading. As with the RF transponders, a specific vehicle is identified by the system at the entrance to a toll road or parking area. Both the RF transponders and image processors provide vehicle identification and vehicle location information for a very limited area and have generally only been used for automatic debiting.

The desire for wide area traffic surveillance data has prompted several academic explorations of ways in which the data could be obtained. There has been proposed a correlation technique based on using millimeter wave radar reflection signals for reidentification of groups of vehicles. In a related study, patterns of groups (or platoons) of vehicles were obtained from inductive loop data, and correlated to determine a group travel time. Processing of the group data appeared to be limited to standard correlation techniques based on examination of a pattern at a first point and waiting until a similar pattern appeared at a second point, for example further down a highway. As long as most of the vehicles remained in the group with the same relative speeds throughout the stretch of highway being monitored, and as long as sufficient data processing capability was available, useful data was obtained. Usage of this technique appears to be limited to short stretches of limited-access freeways where densities are such that vehicles do not change lanes or pass each other very often.

The surveillance capability of existing individual vehicle sensors used for traffic monitoring typically covers a local region of less than 200 feet in length. Information provided by such sensors includes the numbers of vehicles and velocities of individual vehicles in the detection region. When used in an urban network, even if sensors are closely spaced (every ¼ to ½ mile), traffic managers typically have, at best, a disjointed picture of the condition of the network. Generally this picture indicates where congestion might already be occurring because, for example, vehicles are not moving very fast, and there are a lot of them in a local area. However, this information has limited the ability of traffic managers to quickly predict or prevent the onset of congestion or to rapidly dissipate it.

Wide area traffic surveillance is the core of advanced traffic management systems which are necessary components of an intelligent highway vehicle system (IVHS). The stated goals of advanced traffic management systems are:

proactive real-time traffic management to prevent congestion and incidents;

rapid incident detection and efficient incident management;

improved infrastructure planning and utilization of existing transportation assets.

The payoff to the United States for the implementation of advanced traffic management systems has been estimated to be billions of dollars as a direct consequence of reduced loss of time (vehicle delay hours) due to improved congestion management; improved safety due to less congestion and fewer secondary collisions; improved fuel economy in urban areas due to shorter travel times; and less air pollution in urban areas due to shorter travel times.

The wide area traffic surveillance problem is difficult to solve due to the number and density of vehicles to be observed. The problem is compounded by the need to perform the task at thousands of locations in the US alone, which makes it necessary to perform the task with simple and inexpensive hardware. Furthermore, the cost of communicating the information to the traffic management facility where it can be assimilated and distributed is also significant, particularly in the freeway case where the sensors can be miles from the downtown traffic facility. In addition, traffic managers have invested heavily in some areas installing various types of vehicle detection sensors. They wish to integrate the information from all these sensors with the information from a wide area traffic surveillance sensor. A wide area traffic surveillance system which will be successful in solving the traffic problem should address all these issues.

SUMMARY OF THE INVENTION

It is an object of the present invention to provide an improved traffic monitoring system with the capability of monitoring traffic throughout a large area. One specific application for a wide area traffic surveillance system in accordance with the present invention is to monitor a major urban freeway where traffic moves along numerous lanes in each direction and along entrance and exit ramps, with large amounts of merging behavior disrupting the oncoming flow and creating incidents. To effectively monitor the freeway, traffic managers need information over several miles of the freeway and ramps. The information needed includes: whether traffic is flowing normally based upon time of day; whether there is an incident (e.g. a traffic accident); how many lanes are impacted by an incident; and how far away the incident is from the traffic detector locations. Freeway surveillance problems often occur on major urban freeways and often up to 50 miles away from the locus of traffic congestion, such as an urban center. It is therefore an object of the present invention to provide an improved monitoring system capable of providing this information.

Another application for a wide area traffic surveillance system in accordance with the present invention is for monitoring a major arterial street which carries traffic. It is desirable that the wide area traffic surveillance system provide the traffic manager with a picture of the entire traffic situation. The surveillance should not be limited to an intersection, but should span the entire route of the artery from an intersection to an adjacent intersection. Traffic managers are especially interested in, within about 250 feet on either side of each intersection, the type of traffic and queue length in each lane of the artery, individual vehicle and group velocities, and left- and right- turning and lane changing behavior. Traffic managers are also interested in the flow between intersections, and whether the artery is normal or congested. Traffic managers would also like to know the locations and progress of large trucks and buses approaching intersections to adjust the timing of traffic signals (e.g. stop lights) to minimize congestion which these vehicles often cause. It is therefore an objective of the present invention to provide the wide area traffic surveillance with the capability to identify (that is, "fingerprint"), classify and track individual vehicles throughout a large area.

Another situation which benefits from a wide area traffic surveillance system in accordance with the present invention is a complex freeway interchange, such as a diamond interchange. In a diamond interchange, there are multiple entrances and exits from a major artery to a major freeway. Traffic signals control the flow of traffic between the freeway and the artery. It is therefore an object of the present invention to provide the measurement of traffic flows from many different directions and grade separations at the same time. It is a further object that the traffic signals be controlled to route traffic onto and off of the freeway without causing congestion on the artery. Similarly, it is a further object to control traffic flow such that congestion on arteries near freeway exits does not force cars to queue up onto the freeway. It is an object to provide a wide area traffic surveillance system which integrates the outputs of multiple sensors so that a traffic manager can assess and manage the entire situation.

A similar situation involves the management of traffic over a large commercial district such as a large airport where numerous ingress and egress streets must be monitored for both airport and local traffic. Part of the wide area traffic surveillance involves monitoring traffic to various terminals and parking areas. Here, it is an object of the present invention to provide an integrated traffic situation which is presented to an airport traffic manager to allow the management of congestion at peak times and rapid detection and clearing of incidents.

It is an object that the wide area traffic surveillance information cover an area as wide as possible, fingerprint and classify individual vehicles, while being both dynamic and real-time. A static measurement of an area can be used to assess whether congestion has occurred, but it generally will not suffice to warn of the onset of congested conditions. Non real-time, stored wide area data are of historical significance or useful in planning but will not be useful in proactively reducing congestion in a dynamic traffic situation.

The illustrated system of the present invention can provide dynamic wide area measurements of traffic flow for real-time proactive traffic control. The illustrated system of the present invention can provide effective wide area traffic surveillance through an integrated picture of the entire road network, showing such information as areas where heavy traffic flow will soon cause congestion, whether high occupancy vehicle (HOV) lanes are functioning properly, where on-ramp metering or signal light timing needs adjustment to lessen congestion, and which alternative routes could be suggested to motorists and the news media to reduce their travel times.

The illustrated embodiment of the present invention includes a system capable of performing wide area traffic surveillance and the methods for processing gathered data to achieve this. Accordingly, vehicle fingerprints and detection information from multiple sensors are used to provide:

1. dynamic flow characterization of traffic over a wide area,
2. link time (the time it takes for a vehicle to travel from one sensor to another),
3. origin/destination pair measurements across an urban network,
4. rapid detection and characterization of incidents in the network,
5. arrival times of express buses, hazardous material trucks, and other heavy vehicles at various points in the network,
6. effectiveness of ramp metering and signal light control algorithms, and
7. effectiveness of high occupancy vehicle lanes.

This traffic information is preferably provided in real time.

The illustrated embodiment of the present invention includes a processing architecture and organization which efficiently reduces raw data from multiple traffic sensors into the above flow information. The architecture of the system is such that minimal roadside hardware is required, minimizing maintenance cost and maximizing reliability. This is partially accomplished in the illustrated embodiment by partitioning the architecture into two major components, data collection and preprocessing by a plurality of smart sensor interfaces (SSIs), and data management by a multi-sensor advanced tracking system (MATS). A wide area traffic surveillance system in accordance with the illustrated embodiment of the invention utilizes a plurality of SSIs for data gathering and the MATS for data management.

The SSI reduces raw sensor data to individual vehicle detections and fingerprints. The SSIs are preferably implemented in both hardware and software. In the preferred embodiment, the SSIs transmit preprocessed data to the MATS. Due to the low bandwidth requirement between the SSIs and MATS, the SSIs can be located remotely at the roadside. Preferably, a single sensor capable of supplying individual vehicle fingerprints is attached to each SSI.

The MATS is a computer processing architecture preferably implemented with general purpose computer hardware. The MATS reduces vehicle detections and fingerprints provided by the SSIs into the desired flow information. The MATS utilizes a layered processing architecture to control complexity, simplify system integration, and reduce software maintenance costs. The MATS processes data supplied by each SSI to characterize the flow local to the sensor attached to that SSI. The MATS then analyzes flow on the roadway links between sensors. Finally, the MATS combines local and link characterizations to assess flow conditions over the wide area. The MATS processing architecture allows the MATS to be implemented in a central location or to be distributed across multiple processing nodes. This is enabled by the low bandwidth requirements between the MATS processing modules.

Current vehicle detection technology is generally limited to providing traffic information over a very limited local area. According to the illustrated embodiment of the present invention, local inputs from currently installed sensors, sensors which are installed specifically for use with the system, and sensors that may be developed in the future, are integrated into a wide area traffic surveillance system structured to provide the high level network-wide information needed for advanced traffic management. Existing sensors which can provide fingerprinting information, such as video processing systems, RF transponders, and license plate readers, along with data from loop and other non-fingerprint type sensors, may be linked by SSIs into the MATS to provide individual vehicle link time measurements over complex and large traffic areas.

The processing architecture of the invention is designed to allow the link time estimation to take place dynamically, in real time, utilizing processing equipment which is economically acceptable to the traffic management market. The output of the system provides the link time estimates in various formats which are easily integrated into current and future traffic management systems.

DESCRIPTION OF THE DRAWINGS

These and other advantages of the present invention are best understood with reference to the drawings, in which:

FIG. 23 is a partial elevation of a portion of a highway having a plurality of sensors.

DETAILED DESCRIPTION OF THE PREFERRED EMBODIMENT

Overview of the Processing Approach

This section provides a detailed description of a system according to one aspect of the invention. It first presents the general approach to solving the traffic surveillance problem used by the system. After this orientation the details of the system are described using data flow diagrams.

The embodiment described is a processing architecture composed of both hardware and software modules interconnected to produce the traffic surveillance capability. One aspect of the following description is the definition of the processing modules (functions) and how they are interconnected. There are a number of well known algorithmic approaches that implement many of the functions. Additional detail is provided for functions when required or when modification of algorithms common in the signal and data processing literature is needed. In my co-pending U.S. patent application Ser. No. 08/398,770 filed Mar. 6, 1995 my method for modeling the influence of roadway geometric events in order to predict the state of traffic elements is disclosed.

Figure 1:
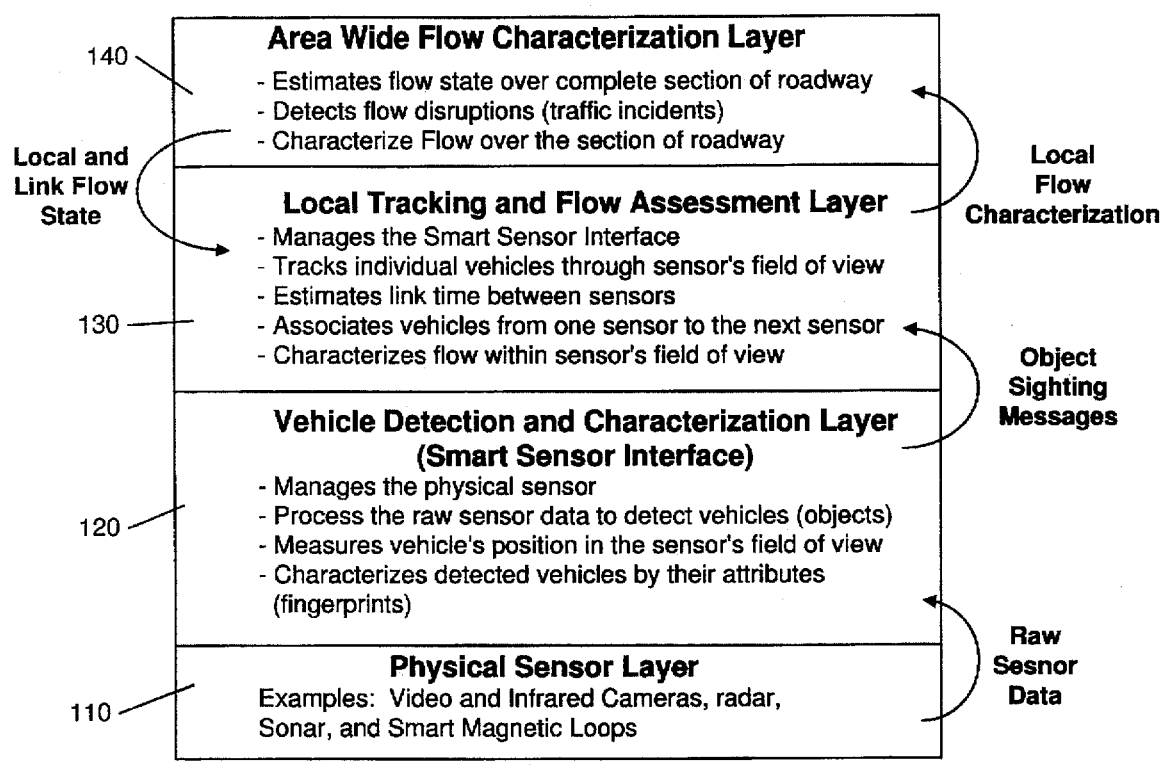
FIG. 1 is a block diagram of a wide area traffic surveillance system in accordance with the present invention.

Referring now to FIG. 1, there is shown a block diagram of a wide area traffic surveillance system according to the invention, depicted as a layered processing structure. This figure shows the system divided into four major layers: a physical sensor layer 110, a vehicle detection and characterization layer 120, a local tracking and flow assessment layer 130, and an area wide flow characterization layer 140. The vehicle detection and characterization layer 120 will also be referred to herein as the "SSI layer." The local tracking and flow assessment layer 130 will also be referred to herein as the "bottom MATS layer." The area wide flow characterization layer 140 will also be referred to herein as the "top MATS" layer. It is this layering and the geographic modularization within each layer that facilitates implementation of the system's traffic surveillance with a software/hardware architecture that is structured for relatively easy fabrication and integration.

The lowest layer of the system is the physical sensor layer 110. The physical sensor layer 110 comprises a plurality of sensors. These sensors may be video cameras, infrared cameras, radar, sonar, RF transponders, license plate readers, or any other sensor which preferably provides fingerprints. For example, a video camera may provide a fingerprint in the form of a video signature for each vehicle which passes through the camera's FOV. This video signature must be unique enough to allow that particular vehicle to be located using the raw video data from one camera's frame to the next. Techniques for using video cameras in this way are described in R. Nasburg, Tracking and Control Systems; *The Infrared and Electro-Optical Systems Handbook*, Chapter 5 of Volume 4; 1993; SPIE-The International Society for Optical Engineering, which is incorporated herein by reference. In addition, loop and other non-fingerprint type sensors may be used in this layer for ancillary information.

The next layer in the system is the SSI layer 120. The SSI layer 120 comprises a plurality of SSIs. Preferably, each SSI is attached to a single sensor, with the SSI receiving raw data input from its attached sensor. The SSIs process raw sensor data to detect vehicles within each sensor's FOV. An SSI characterizes each detected vehicle by the vehicle's location within the attached sensor's FOV and by the vehicle's fingerprint.

The SSIs reduce raw sensor data into objects that represent the vehicles. The objects are communicated to the bottom MATS layer 130 as "Object Sighting Messages" (OSMs). Because communication of OSMs to the MATS from the SSIs does not require a significant communication capability, the SSIs may be located remote from the MATS. Since the OSMs contain the basic information needed for traffic surveillance, the SSI layer 120 performs the first step in conversion of the sensors' data into the overall flow assessment.

The bottom MATS layer 130 converts OSMs from the SSI layer 120 into a first stage of traffic flow information. The bottom MATS layer 130 develops flow information for individual vehicles by reduction of the data from the SSI layer 120. Flow information developed at the bottom MATS layer 130 includes vehicle velocity, vehicle densities, vehicle classification (e.g. motorcycle, car/pickup, truck, bus, etc.), vehicle behavior (e.g. lane changes), and link times. In addition, a path history is developed for individual vehicles. To develop a path history, a list of sensors which have sensed a particular vehicle is entered in a database. The path histories may be used to assess flow patterns within the roadway system.

Flow within a sensor's FOV is referred to herein as "local flow". The bottom MATS layer 130 produces for each SSI, a micro model description of local flow. Micro models are described in A. May, *Traffic Flow Fundamentals;* 1990; Prentice-Hall; Englewood Cliffs, N.J.; Chapter 6, which is incorporated herein by reference. May, on page 182, discusses "a single presence detector and the microscopic flow characteristics that can be obtained". The bottom MATS layer 130 communicates the local flow information to the top MATS layer 140 for further processing. To communicate this information, the bottom MATS layer 130 aggregates the individual vehicle flow characteristics into macro parameters. This conversion between individual vehicle detections and micro and macro descriptions is the data reduction produced by the bottom MATS layer 130.

The top MATS layer 140 uses a macro model to describe flow over an entire section of roadway. Macro models are described in A. May, *Traffic Flow Fundamentals;* 1990; Prentice-Hall; Englewood Cliffs, N.J.; Chapter 13, which is incorporated herein by reference. May, on page 396, notes that many computer models are available in the form of "both microscopic and macroscopic simulation models." The top MATS layer 140 communicates aggregate link flow information to the bottom MATS layer 130, which is useful to the local tracking activity of the bottom MATS layer 130. Information communicated by the top MATS layer 140 to the bottom MATS layer 130 includes estimated average flows into each sensor's FOV and the velocity profiles on the roadway links between a particular sensor and any adjacent sensors.

The top MATS layer 140 assesses flow over each link of interest. It uses modern estimation theory to fit a macro model of the velocity and density of vehicles in each link to the local flow measurements developed in the bottom MATS layer 130. The bottom MATS layer 130 hence acts as a data source for the model fitting of the top MATS layer 140. Other aggregate flow information (ancillary information) such as data from magnetic loops is also employed in the model fitting process. The result of this processing is a flow assessment for each link in terms of state variables, typically velocity and vehicle density. State variables are described in P. Maybeck, *Stochastic models, estimation, and control;* 1979; Academic Press; NY, N.Y., which is incorporated herein by reference, A further function performed at the top MATS layer 140 is an assessment of the macro flow for flow anomalies such as traffic incidents which interrupt the normal flow of a link. Rapid detection and assessment of traffic incidents and other flow disturbances is accomplished by the top MATS layer 140 through a model fitting process. Micro flow assessment is performed at the bottom MATS layer 130 to detect flow anomalies based on individual vehicle behavior (such events as a vehicle pulling onto the roadside, an accident within a sensor's FOV, or a malfunctioning of a signal).

In the following sections data flow diagrams, FIGS. 2–22, are used to describe how the processing layers described above are implemented in the preferred embodiment. The use of data flow diagrams is described in D. Hatley and I. Pirbhai; *Strategies for Real-Time System Specification;* 1988, Dorset House, NY, N.Y., which is incorporated herein by reference. Data flow diagrams were chosen since they provide an efficient method of describing the processing functions by organizing the description hierarchically. Each layer of the hierarchy is broken down into the major functions (processes) implementing the functionality of that layer and the data interconnects between functions. This description starts at the top level and proceeds down through the different levels of the hierarchy to the elementary levels. Minor functions that would be obvious to those of ordinary skill in the art or that do not contribute to understanding of the system or its best mode have been eliminated in the data flow description.

Description of the Context Diagram

Figure 2:
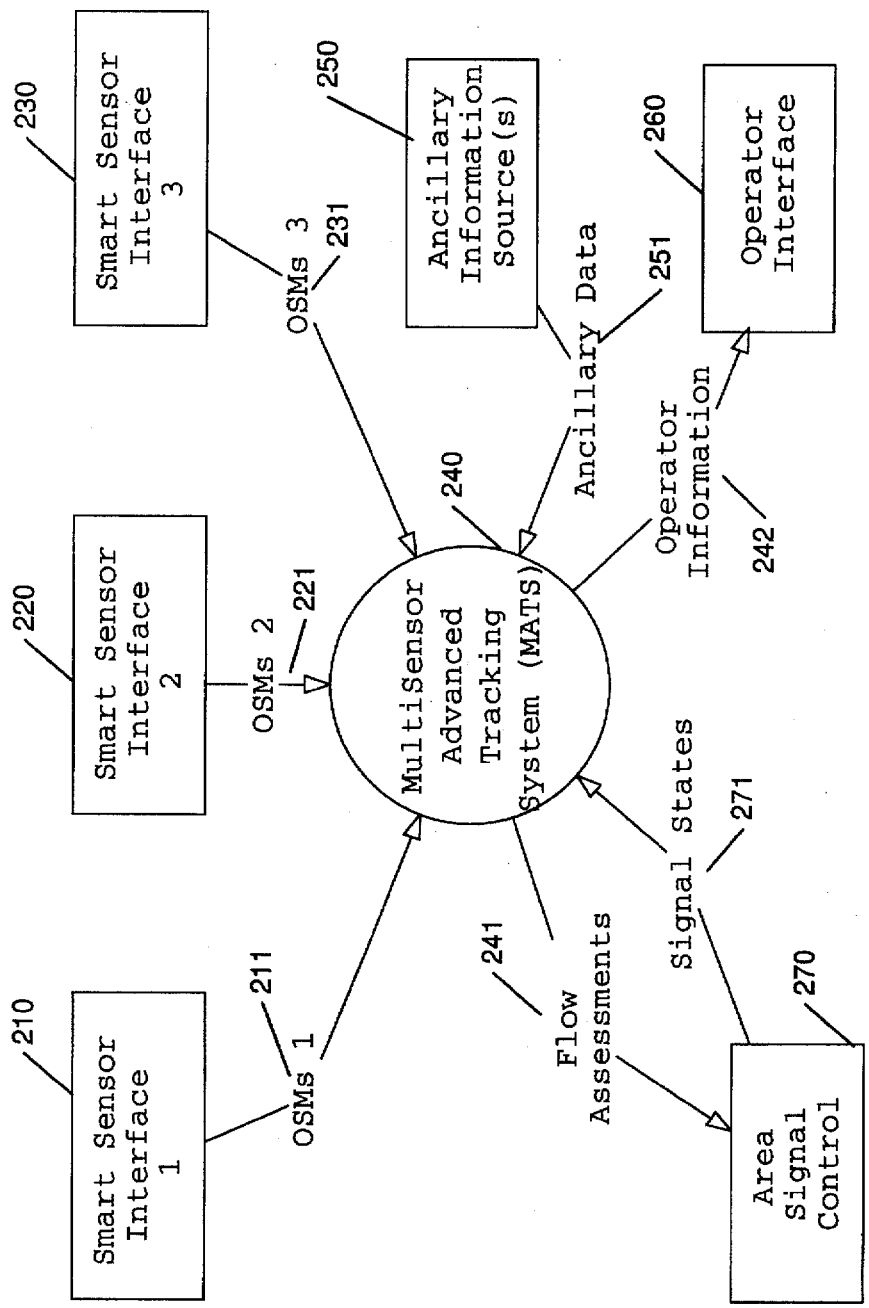
FIG. 2 is a data flow diagram of the wide area surveillance system of FIG. 1.

Referring now to FIG. 2, there is shown a data flow diagram of the wide area surveillance system of FIG. 1. As explained, the local tracking and flow assessment layer 130 and the area wide flow characterization level 140 comprise the MATS 240. FIG. 2 shows the relationship between the MATS 240, a plurality of SSIs 210, 220, 230 and other systems and information sources external to the MATS 250, 260, 270. Although the SSIs 210, 220, 230 are part of the wide area traffic surveillance system of the present invention, FIG. 2 focuses on the MATS 240 since description of the SSIs 210, 220, 230 can be separated from the description of the MATS 240. Thus, the connection of the SSIs to sensors is not shown in the drawings. However, the sensors attached to the SSIs 210, 220, 230 will be referred to as sensor 1, sensor 2 and sensor 3, respectively.

In FIG. 2, three SSIs, SSI 1 (210), SSI 2 (220), and SSI 3 (230) are shown. The system can employ any number of SSIs. Three SSIs are used in this description since the generalization from three SSIs to a number likely to be practiced is straight forward to those of ordinary skill in the art. The significant features of the system can be explained using three SSIs.

In FIG. 2, information sources have been divided into two different classes. Information sources that provide fingerprinting information are represented by the SSIs 210, 220, 230 along the top of the diagram. These information sources 210, 220, 230 provide, as OSMs 1 (211), OSMs 2 (221), and OSMs 3 (231), respectively, information about the individual vehicles which allows them to be located from sensor output sample to sensor output sample and from sensor location to sensor location. In particular, the OSMs from a particular SSI will preferably contain a record for each vehicle detected by the SSI within the attached sensor's FOV. Although a vehicle's record will depend on the type of sensor and the SSI, it will preferably contain the following information about the vehicle:

(1) Vehicle location in the sensor's FOV;

(2) Lane containing the vehicle;

(3) Time tag of the vehicle detection, that is, time that the sensor's output was sampled by the SSI;

(4) Attributes (fingerprint) for the vehicle; and (5) Quality measure of the vehicle's detection.

The other information sources 250, 270 shown in FIG. 2 do not provide fingerprinting information. These sources of information include an ancillary information source 250 and an area signal control 270.

The ancillary information source 250 may comprise any number of sources, but for simplicity is referred to as a single source. The ancillary information source 250 may be provided, for example, by magnetic loop counts and derived velocities. Although the ancillary information source 250 generally does not provide fingerprints, it does provide information usable in flow assessment. The ancillary information source 250 transfers information to the MATS 240 in an ancillary data flow 251.

The area signal control 270 includes the controllers for traffic signal lights, traffic advisory signs, traveler's information radios and systems, and other mechanisms that can influence traffic flow in real time. The area signal control 270 transfers data in a signal states data flow 271. The transferred information includes the state of the traffic signals (red, yellow, green) and the state of traffic advisory signs within salient sections of roadway.

Other non-real-time information such as the condition of the roadway, locations of roadway maintenance, and weather conditions which may also be fed to the MATS 240 are not shown to further simplify this description. The other information used in the MATS 240 preferably includes the geometric layout of the roadway and sensor locations. Although this information is not shown in the data flow descriptions, those of ordinary skill in the art will understand the use and incorporation of such information into the MATS 240.

There are two information sinks shown in FIG. 2. An information sink is an item which receives a data flow. One sink is the area signal control 270, which receives, preferably in real time, the flow assessment developed by the MATS 240, in a traffic flow assessments data flow 241. Flow information is dependent on the area signal control's 270 requirements and could include vehicle density and velocity functions, along links, or large areas, shock wave location and velocity, vehicle queue lengths, location of emergency vehicles and heavy trucks, location and severity of incidents, traffic flow patterns through intersections, etc. This high quality real-time traffic flow information may be used to provide proactive traffic control.

The other information sink shown is the operator interface 260. The operator interface 260 is sent flow information needed by the traffic management personnel for real-time traffic condition assessments, and flow information to be stored for use in traffic planning studies. This information is transferred by the MATS 240 in an operator information data flow 242. Preferably, the system can provide to operators any flow information available within the system's processing layers. This includes information at the micro level (information about individual vehicles) and at the macro level (information from the top MATS layer 140). To reduce internal communication bandwidths within the computer facilities used for the MATS 240, operator information is preferably provided only on demand. For example, if the operator requests vehicle queue lengths from a particular roadway location, the MATS 240 extracts the desired data from its processing stream and routes the data to the operator interface 260 for display. This approach minimizes the data bandwidth within the MATS 240 needed to support traffic information.

Some flow conditions or data need to be continuously monitored for the operator by the MATS 240. One such condition is traffic incidents. To monitor for traffic incidents the operator develops a monitoring script defining for what data to perform automatic condition monitoring and reporting. For example, the monitoring script might instruct the MATS 240 to monitor the queue length of a particular freeway entrance ramp. If the queue length of the selected ramp grows above a defined length, the MATS 240 will send a message to the operator interface 260 along with the freeway flow states. The operator can then request additional data and/or take other action. Preferably, the monitoring script may be changed or modified by the operator in real time.

Description of the Smart Sensor Interfaces

The SSIs 210, 220, 230 are used to interface each sensor capable of supplying fingerprint information about individual vehicles to the MATS 240. In this description, the three SSI's 210, 220, 230 are identical. Each SSI 210, 220, 230 performs the first stage in reduction of raw sensor data into flow assessment by detecting individual vehicles in the attached sensor's FOV and measuring the vehicle's fingerprint. Each SSI 210, 220, 230 thus reduces raw sensor data into OSMs (Object Sighting Messages) for output, respectively OSMs 1 (211), OSMs 2 (221), OSMs 3 (231). The OSMs 211, 221, 231 contain information quantifying each detected vehicle and its fingerprint.

Each SSI 210, 210, 230 is preferably implemented as a hardware module with firmware and application software to execute the SSI's functionality. This implementation has the advantage of low production cost with flexibility for software upgrades. Each SSI 210, 220, 230 preferably contains hardware to interface with the attached sensor, firmware and software to detect vehicles and measure a vehicle's fingerprint, a real-time clock to attach the time (time tag) of the vehicle detections, and an interface to a communications system which links the SSIs 210, 220, 230 to the MATS 240. Communication between the SSIs 210, 220, 230 and the MATS 240 is preferably two way, to enable management of the SSIs 210, 220, 230 by the MATS 240.

The system can be used with any SSI that meets the requirements of detection of individual vehicles and generation of a vehicle's fingerprint. That is, the system does not restrict the SSI to video or microwave sensors. Suitable sensors include radar sensors, imaging infrared sensors, video cameras, smart loop sensors, smartcard readers, and license plate readers.

Each of the sensor types listed have advantages and disadvantages. For example, video sensors can be used by the system and also for real-time surveillance by a human operator, hence reducing system cost by getting double duty from a sensor. Video sensors provide very good fingerprinting information due to the wide diversity of vehicle shapes and colors. A disadvantage of video sensors are their inability to operate in heavy fog. Radar sensors can operate in fog but are costly and do not provide the quality of fingerprinting information available in a video data stream.

To illustrate the functionality of an SSI, an example using a video camera is given. In this case, the SSI's software removes uninteresting areas of the scene (non-roadway areas) as defined during setup of the SSI. Video FOV's tend to include both roadway and non-roadway areas. By eliminating the non-roadway areas from further processing, SSI hardware requirements are reduced.

The SSI scans the roadway part of the video sensor's image to detect vehicles. The video sampling rate may be, for example, one frame per second. Preferably, the video sampling rate is variable and is based upon the particular conditions of the network. Several approaches common to image processing can be used for vehicle detection. Automated image processing is described in R. Haralick and L. Shapiro, *Computer and Robot Vision;* 1992; Addison-Wesley; Reading, Mass.; Chapter 2, 3, and 4 and W. Pratt, *Digital Image Processing;* 1991; Wiley; NY, N.Y.; Section 18.1 and N. L. Seed and A. D. Houghton, Background Updating for Real-Time Image Processing at TV Rates, 1988 which are incorporated herein by reference. The imagery associated with detected vehicles is then analyzed to develop a set of features or attributes that quantify a particular vehicle's fingerprint. The extracted attributes thus represent the fingerprint. Approaches from image processing and pattern recognition can be used for generation of the vehicle's attributes. Several such approaches are described in R. Haralick and L. Shapiro, *Computer and Robot Vision;* 1992; Addison-Wesley; Reading, Mass.; Chapter 9 and 10 and K. Fukunaga, *Introduction to Statistical Pattern Recognition;* 1972; Academic Press; NY, N.Y. which are incorporated herein by reference. For a video camera, typical attributes could include vehicle image size, average grey level, normalized red, green and blue average values, shape moments, and grey level spread between maximum and minimum grey level values of the vehicle's image.

An OSM sent to the MATS 240 from an SSI which is coupled to a video sensor is preferably composed of the time (time tag) that the sensor's data stream was sampled and a record for each vehicle detected. The vehicle's record preferably includes:

(1) the vehicle's location in the sensor's FOV'
(2) the attributes quantifying the vehicle's fingerprint; and
(3) the detection quality factor quantifying the likelihood that the vehicle was detected correctly.

Description of the MATS Data Flow Diagrams

This section provides the data flow diagrams (DFDs) that describe the functions and architecture of the MATS component of the system. This description will be made with reference to the system as applied to an example roadway area. Referring now to FIG. 23, there are shown two lanes 2300 of a multilane divided highway of the roadway area. The highway includes a first local area 2340, a second local area 2360, and an on ramp 2350. As can be clearly seen in this figure, first local area 2340 and second local area 2350 constitute discrete sections, that is non-contiguous regions. For monitoring the highway 2300, there are provide three sensors, sensor 1, sensor 2, and sensor 3, having corresponding FOVs, sensor 1 FOV 2310, sensor 2 FOV 2320, and sensor 3 FOV 2330. Sensor 1 FOV 2310 and sensor 2 FOV 2320 overlap in an overlap region 2315. Sensor 3 FOV 2330 is in the upstream area 2360 from traffic coming from the sensor 1 FOV 2310 and the sensor 2 FOV 2320. The region of the highway between the sensor 1 FOV 2310 and sensor 3 FOV 2330 comprises a link. The sensor FOVs define a registration point for each sensor, which is the point in the FOV at which the sensor is able to detect with sufficient accuracy a vehicle entering or exiting the FOV.

Multisensor Advanced Tracking System

Figure 3:
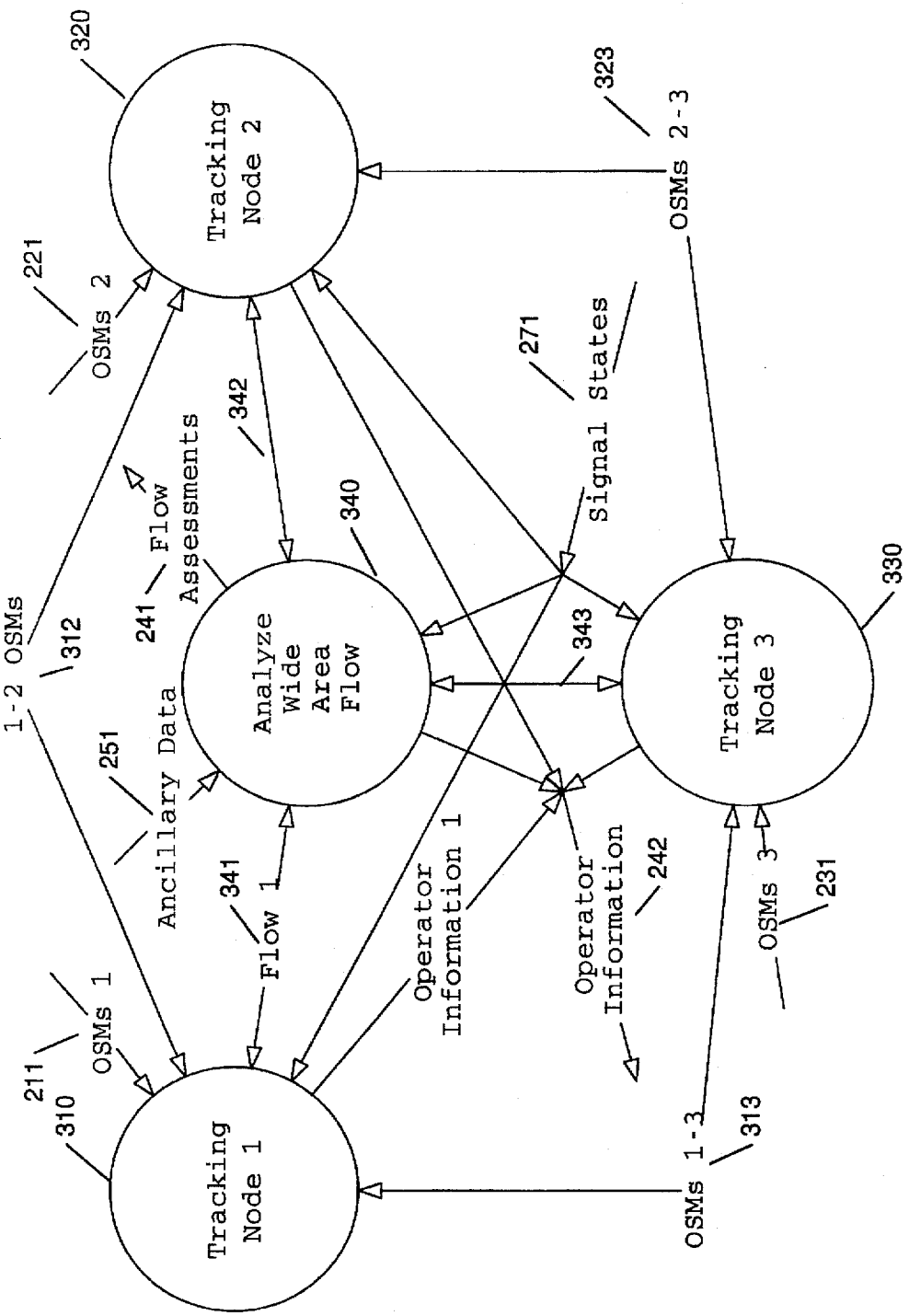
FIG. 3 is a data flow diagram of the MultiSensor Advanced Tracking System (MATS)

Referring now to FIG. 3, there is shown a data flow diagram of the MATS 240. This figure shows all the functions that occur both at the top MATS layer 140 and the bottom MATS layer 130. The functions of the top MATS layer 140 are implemented as a process called analyze wide area flow 340. The functions of the bottom MATS layer 130 are implemented in three processes entitled tracking node 1 (310), tracking node 2 (320), and tracking node 3 (330). Data flows between the analyze wide area flow process 340 and the tracking nodes 310, 320, 330 through flow 1 (341), flow 2 (342) and flow 3 (343), respectively. The particular data which flows between the analyze wide area flow process 340 and the tracking nodes is discussed below.

FIG. 3 illustrates the geographical partitioning of the system. For example, SSI 1 (210) provides data through the OSMs 1 data flow (211) directly into tracking node 1 (310). Tracking node 1 (310) provides an understanding, at the individual vehicle level, of the flow within the FOV of sensor 1. Tracking node 1 does not directly receive data from any other SSI. Similarly, tracking node 2 (320) is fed directly from SSI 2 (220), and tracking node 3 (330) is fed directly from SSI 3 (230). Hence, in the preferred embodiment each tracking node is geographically diverse or partitioned from the other tracking nodes, The system thereby achieves simplified processing in the bottom MATS layer 130 of the processing structure though modularization.

In the described embodiment, in addition to OSMs 1 (211), there are two other data flows coming into tracking node 1 (310)—one coming from tracking node 2 (320) and the other one coming from tracking node 3 (330)—designated as OSMs 1-2 (312) and OSMs 1-3 (313), respectively. The OSMs 1-3 (313) represents the fact that, in this embodiment, a section of the roadway 2300 links sensor 1 with sensor 3. Consequently, vehicles identified by sensor 1, will after a period of time (link time) transition down the roadway link and appear in the sensor 3 FOV. The OSMs 1-3 data flow 313 carries the object information representing the flow of vehicles across the link. Consequently, tracking node 3 (330) receives and processes OSMs coming from its own SSI 3 (230), OSMs 3 (231), along with object handovers from tracking node 1 (310). Furthermore, since sensor 1 and sensor 2 are overlapping, then OSMs are passed between tracking node 1 (310) and tracking node 2 (320) by a data flow called OSMs 1-2 (312).

Tracking node 1 (310) determines if a vehicle will proceed down a highway link and potentially enter the sensor 3 FOV 2330. If a vehicle is flowing down a link between the sensor 1 FOV 2310 and the sensor 3 FOV 2330, then tracking node 1 (310) will identify that event, extract the vehicle identification from its own internal database, and send the vehicle identification to tracking node 3 (330) for update of the tracking activity at tracking node 3 (330). The exchange of vehicle information between each of the tracking nodes is one of the important features of the illustrated system. It is by this mechanism that the link time, the amount of time required by a vehicle to transition from one sensor location to the next sensor location, is preferably measured. This is an important parameter for assessing the overall flow at the top layer of the processing layers.

Further, by exchanging vehicle information between the tracking nodes, origination-destination pairs can be assessed. In other words, a tracking node ID is attached to a vehicle's database record as the vehicle proceeds through the sensor 1 FOV 2310 of sensor 1. When the vehicle appears in the sensor 3 FOV 2330, an ID is supplied to the vehicle at tracking node 3 (330), and so forth, throughout the entire system. In this way, location sighting data can be accumulated for each vehicle as it proceeds through the entire highway system. The location sighting data is an important statistic allowing traffic origination and destination to be assessed and measured.

The flow assessments developed at the highest layer of the processing structure flow down into the tracking nodes to aid the internal tracking algorithms. Items of ancillary data 251 useful within the tracking nodes 310, 320, 330 flow from the highest layer (FIG. 3) represented by the analyze wide area flow process 340 to the tracking nodes 310, 320, 330. Also, signal states 271 from the area signal control 270 flow into the tracking nodes. Further, information about the individual vehicle flows is aggregated in the tracking nodes and sent to the analyze wide area flow process 340 where it is utilized in the top MATS layer 140 assessment of the flow along the entire roadway. Preferably, operators may obtain upon demand information at an individual vehicle level which has been accumulated within the tracking nodes and sent to the operator interface 260.

The analyze wide area flow process 340 provides within the top MATS layer 140 an understanding and assessment of the flow along the entire section of roadway. Information utilized by this process includes aggregated individual flow information 341, 342, 343 from each of the tracking nodes 310, 320, 330, hence, from each of the sensors. This aggregated information is used within the process 340 to model the flow by use of a macro modeling technique. Macro modeling techniques are described in A. May, *Traffic Flow Fundamentals*; 1990; Prentice-Hall; Englewood Cliffs, N.J.; Chapter 13, which is incorporated herein by reference. The resulting flow information is fed back to the area signal control 270 through the flow assessment data flow 241 and back to the operator through the operator information data flow 242. As with the tracking nodes 310, 320, 330, the operator interface data is produced from the analyze wide area process 340 on demand.

In the descriptions to follow, only tracking node 1 (310) will be described. Tracking node 2 (320) and tracking node 3 (330) are substantially identical in functionality to tracking node 1 (310), except where explained below.

Tracking Node 1 (310)

Figure 4:
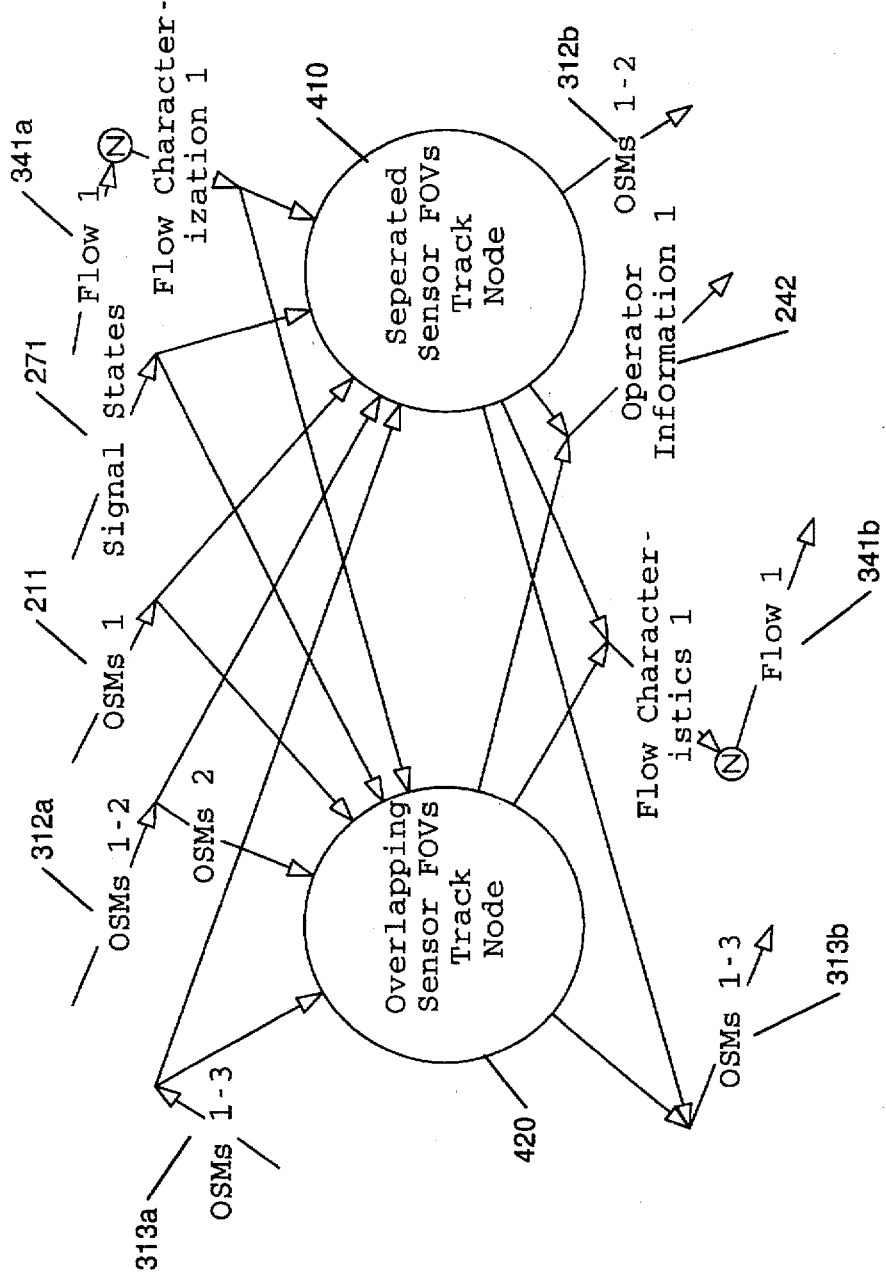
FIG. 4 is a data flow diagram of a tracking node in the MATS of FIG. 3.

Referring now to FIG. 4, there is shown a data flow diagram of tracking node 1, as a model of tracking nodes in the system. In particular, this diagram shows that the tracking node is separated into two cases, an overlapping sensor FOVs tracking node 420 and a separated sensor FOVs tracking node 410. Both of these subsidiary tracking nodes are preferably included within each primary tracking node, since a particular sensor, such as sensor 1 may have an overlapping FOV with some sensor (i.e. sensor 2) and have a separate FOV from other sensors (e.g. sensor 3).

Recall that in this example, sensor 1 FOV 2310 and sensor 2 FOV 2320 overlap. Thus, the overlapping sensor FOVs tracking node 420 receives OSMs from SSI 1 (210) through data flow OSMs 1 (211), and tracking node 2 through data flow OSMs 1-2 (312a). The separated sensor FOVs tracking node 410 receives OSMs from: SSI 1 (210) through data flow OSMs 1 (211); tracking node 2 (320) through data flow OSMs 1-2 (312a); and tracking node 3 (330) through data flow OSMs 1-3 (313a).

In FIG. 4, a further breakdown of the data flows between the tracking node 310 and the analyze wide area flow process 340 can be seen. The data 341a received by the tracking node 310 are characterizations of the wide area flow. The data 341b transmitted by the tracking node 310 to the analyze wide area flow process 340 are characteristics of the traffic flow.

Regardless of whether sensor 1 and sensor 2 have overlapping FOVs, and so long as they are at least linked, OSMs from tracking node 1 (310) will be transmitted by OSMs 1-2 (312) to tracking node 2 (320). A similar configuration applies with respect to sensor 3.

Separated Sensor FOVs Tracking Node 410

Figure 5:
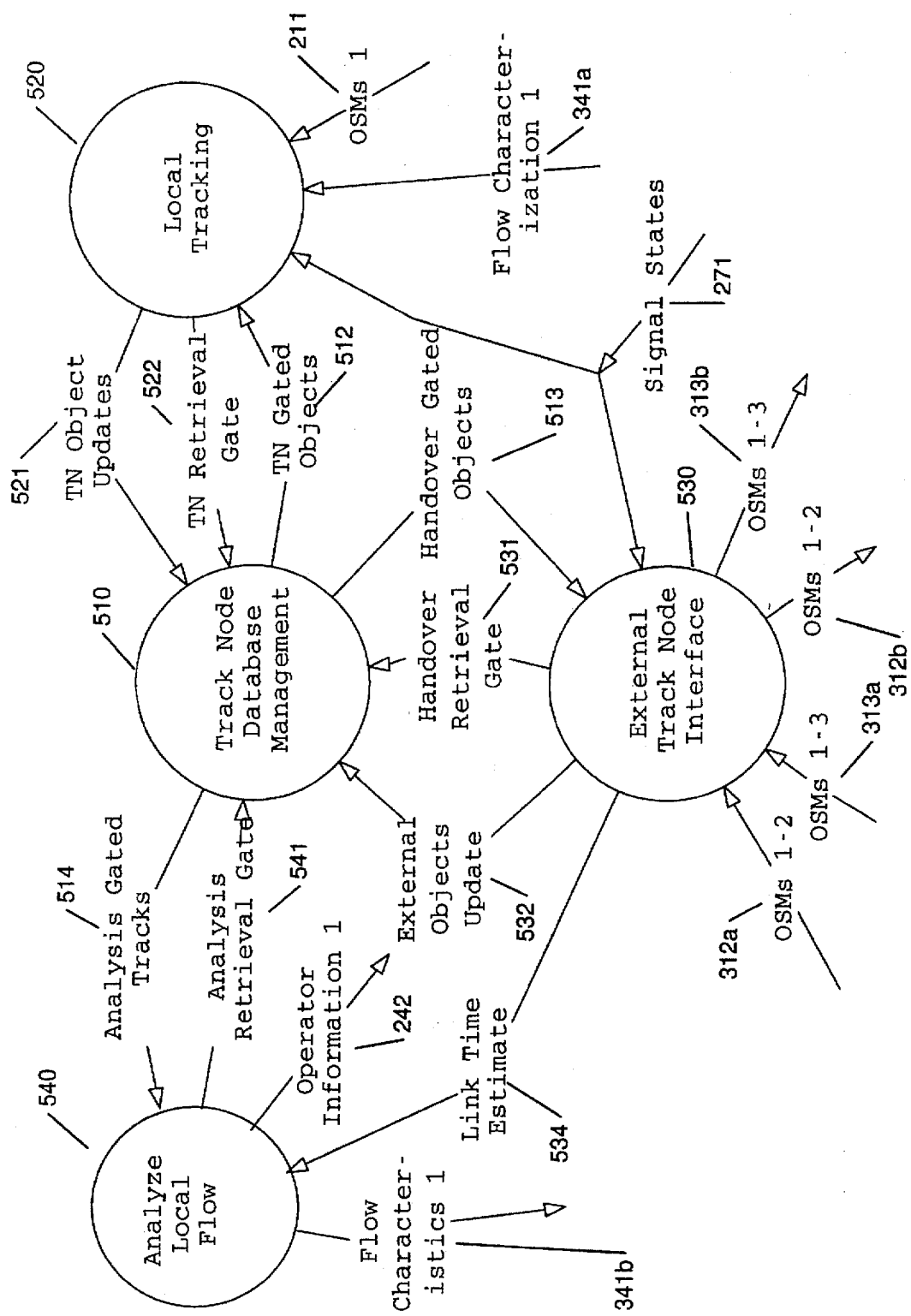
FIG. 5 is data flow diagram of a separated sensor FOVs tracking node of the tracking node of FIG. 4.

Referring now to FIG. 5, there is shown a data flow diagram of the separated sensor FOVs tracking node 410. The separated sensor FOVs tracking node 410 includes: a tracking node database manager 510, a local tracking process 520, an external tracking node interface 530, and an analyze local flow process 540. Other tracking nodes to this tracking node are called "external tracking nodes," and processing for this tracking node is called "local."

The external tracking node interface 530 handles the interface or OSM handover to the other tracking nodes. Hence, the external tracking node interface 530 receives data through OSMs 1-2 (312a) and OSMs 1-3 (313a), and transfers data through OSMs 1-2 (312b) and OSMs 1-3 (313b). The external tracking node interface 530 also estimates link time and transfers this information through a link time estimate data flow 534 to the analyze local flow process 540.

The analyze local flow process 540 provides analysis of the local flow in order to extract operator information and flow characterization for the top MATS layer 140. For example, this process 540 might aggregate tracks over a given time period as a measure of local flow for that time period. The flow characterization is sent on the flow characteristics data flow 341b. The information produced by the analyze local flow process 540 is described more fully in the description of the analyze wide area process 340, below. The operator information which may comprise any local flow information which the operator requests, as described above, is sent on the operator information data flow 242.

The local tracking process 520 provides the local tracking functionality. This process converts OSMs from OSMs 1 (211) into a description of a flow of an individual vehicle through the sensor's FOV. The description of the movement of an individual vehicle through a particular sensor's for FOV is called a "track" herein. Local tracking 520 is the step which converts data from the sensor associated with the tracking node, here sensor 1, into vehicle flow information.

The concept utilized in this DFD explanation is centered around a database, implemented in the tracking node database manager 510. All object information is kept as records within the database. A database record preferably includes the following data:

(1) Object Source Registration point time tag;
(2) Predicted time of arrival within sensor FOV;
(3) Time tag of the object sighting;
(4) Location in the sensor FOV of the vehicle;
(5) Lane (or pseudo lane) in which the vehicle was found;
(6) Attributes quantifying the vehicle's fingerprint;
(7) ID of each sensor that has detected the vehicle;
(8) Track ID identifying the track to which the vehicle belongs;
(9) Track characteristic including track split or track merge;
(10) Track quality;
(11) Flow information (velocity, acceleration) for this vehicle;
(12) Vehicle classification (for example, pedestrian, motorcycle, car/pickup, truck, bus, etc.) of this vehicle; and
(13) Vehicle behavior such as lane changing.

The tracking node database manager 510 is used by the other processes 520, 530, 540 of the tracking node. In this architecture the database serves as the data memory for the objects (vehicles) found by the SSIs. This requires that the database be constructed for concurrent operation. Concurrently operating databases are described in J. Ullman, *Principles of Database Systems;* 1980, Computer Science Press; Potomac, Md.; Chapter 10, which is incorporated herein by reference. The other processes 520, 530, 540 operate on records (objects) within the database to develop flow information and to update the database. Thus, the processes transfer data (i.e. communicate) through the database. The substance of these exchanges and the related data flows are discussed below. In this data flow diagram, only the link time estimate 534 is communicated directly from the external tracking node interface 530 to the analyze local flow process 540. This allows the other processes to run autonomously, thereby simplifying software design.

The other processes 520, 530, 540 generate retrieval specifications or queries to obtain information from the database, and provide updates to the database. Information retrieved from the database in response to queries for objects are called "gated objects" herein. Information retrieved from the database to queries about local flow of specific objects are called "gated tracks" herein. The local tracking process 520 and the external tracking node interface 530 have the dual roles of users of information from the database and updaters of the information in the database. The external tracking node interface 530 receives object sighting information from the other tracking nodes as explained above, processes that information, and places the information into the database with the appropriate tagging. Further, the external tracking node interface 530 queries the database to see if an object is predicted to enter the FOV of a subsequent tracking node or sensor; if so, the external tracking node interface 530 forms an OSM and sends that particular information out on the appropriate data flow (here OSMs 1–2 or OSMs 1–3).

The local tracking process 520 is responsible for stringing together tracks through data association of objects in the tracking node database. This process converts individual OSMs into strings of objects forming tracks which represent the flow for an individual vehicle. This is important since the tracks form the basis of flow characterization. Forming individual vehicle tracks allows characterization of the vehicle's velocity and the vehicle's merging or turning behavior. Classification of vehicles such as motorcycle, car, pick-up, truck, and emergency vehicle is also implemented by the local tracking process 520.

Tracking Node Database Manager 510

Figure 6:
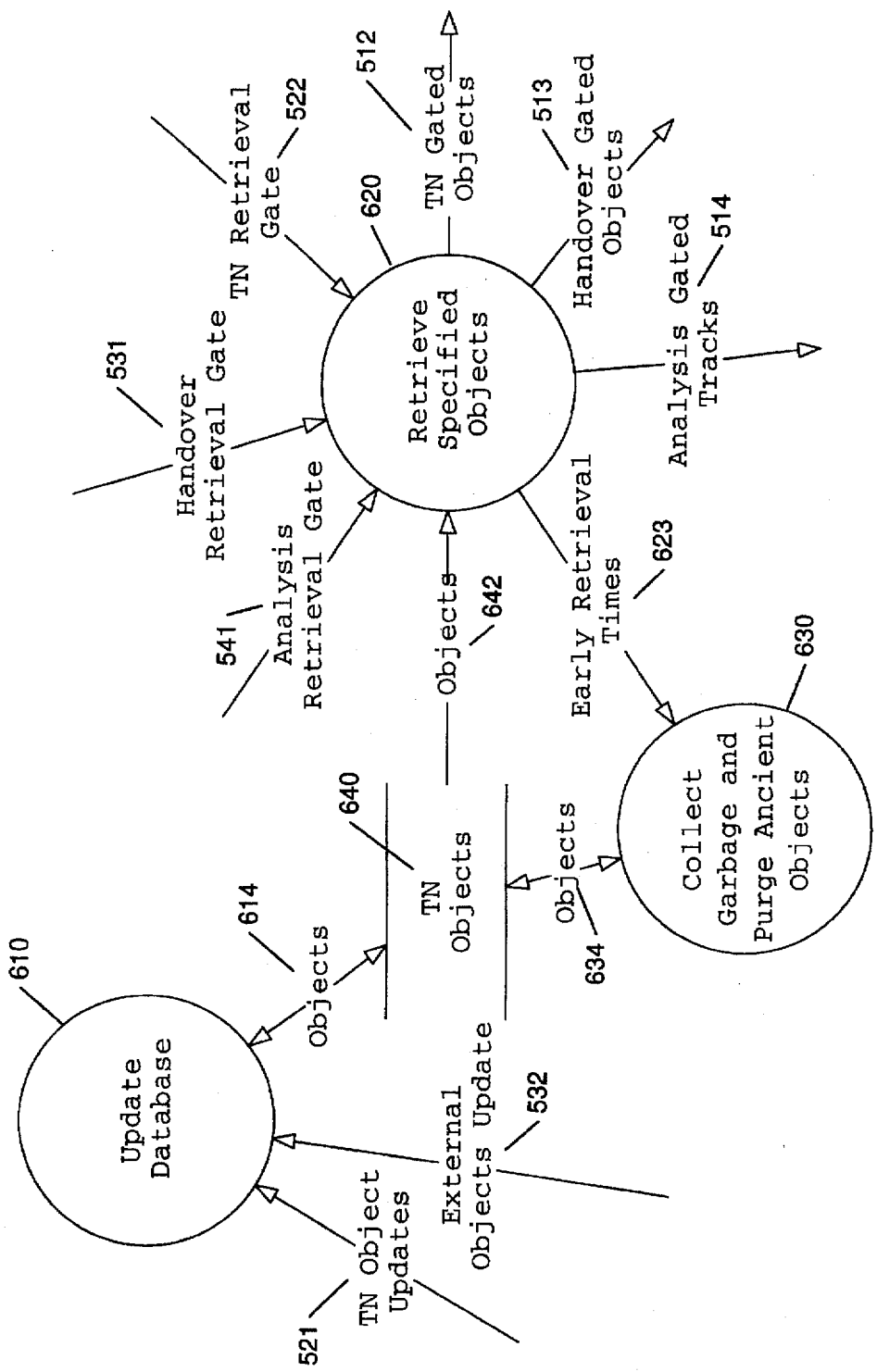
FIG. 6 is a data flow diagram of a tracking node database management process of the separated sensor FOVs tracking node of FIG. 5.

Referring now to FIG. 6, there is shown a data flow diagram of the tracking node database manager 510. FIG. 6 also shows a portion of the database used for storage of the tracking node's objects—TN objects 640. The tracking node database manager 510 includes an update database process 610, a retrieve specified objects process 620, and a collect garbage and purge ancient objects process 630.

The update database process 610 is straightforward. This process 610 takes update information from the local tracking process 520 and the external tracking node interface 530, converts the update information into object updates, and updates the object's records in TN objects 640.

The primary function of the database is retrieval of objects needed for data association and flow analysis. This function is performed by the retrieve specified objects process 620. The retrieve specified objects process 620 receives specifications from the analyze local flow process 540 referred to as the analyze retrieval gate 541, from the local tracking process 520 referred to as the TN retrieval gate data flow 522, and from the external tracking node interface 530 referred to as the handover retrieval gate data flow 531.

The retrieve specified objects process 620 takes these retrieval specifications, retrieves all objects meeting the specification, and sends the objects back to the requesting process. The objects are sent back on any of three data flows: a TN gated objects data flow 512, a handover gated objects data flow 513, or an analysis gated tracks data flow 514. The local tracking process 520 receives tracking node gated objects on the TN gated objects data flow 512. The external tracking node interface 530 receives handover gated objects on the handover gated objects data flow 513. The analyze local flow process 540 receives analysis of gated tracks on the analysis gated tracks data flow 514.

For example, another tracking node might send through the handover retrieval gate data flow 531 the following specification "Retrieve all objects with sensor ID=23 and time tags between time tags between 12245 and 12319". The retrieve specified objects process 620 would obtain these objects from the data store 640 and return them to the other tracking node via the external tracking node interface 530 through the handover gated objects data flow 513.

The collect garbage and purge ancient objects process 630 is responsible for the management of the database structure. Objects are deemed ancient in the sense that the objects have left the FOV of the sensor or are so old that they are no longer of interest to the tracking activities. This function goes through the database and purges records meeting the ancient specification, which keeps the storage requirements within bounds.

The other function carried out by the collect garbage and purge ancient objects process 630 is the garbage collection function. Garbage collection is described in J. Ullman, *Principles of Database Systems;* 1980, Computer Science Press; Potomac, Md., Chapter 2 which is incorporated herein by reference. If this system is to be used for long-term operation, the structure of the database can become inefficient. The database can be filled with memory areas that are unused. If errors occur, this can compound the database storage problem. Garbage collection is a database function which periodically analyzes the database structure, the memory utilization, how records are linked together within the database, and does database compaction and structure correction. It also purges records within the database which no longer fit the database structure due to errors or other abnormal database events. This process 630 is run in a background mode, awakening periodically for a cleaning operation on the database. The update database process 610, and the retrieve specified objects process 620 functions are run on demand. When data is received on an appropriate data flow, these processes run; otherwise, they remain in stasis.

Update Database 610

Figure 7:
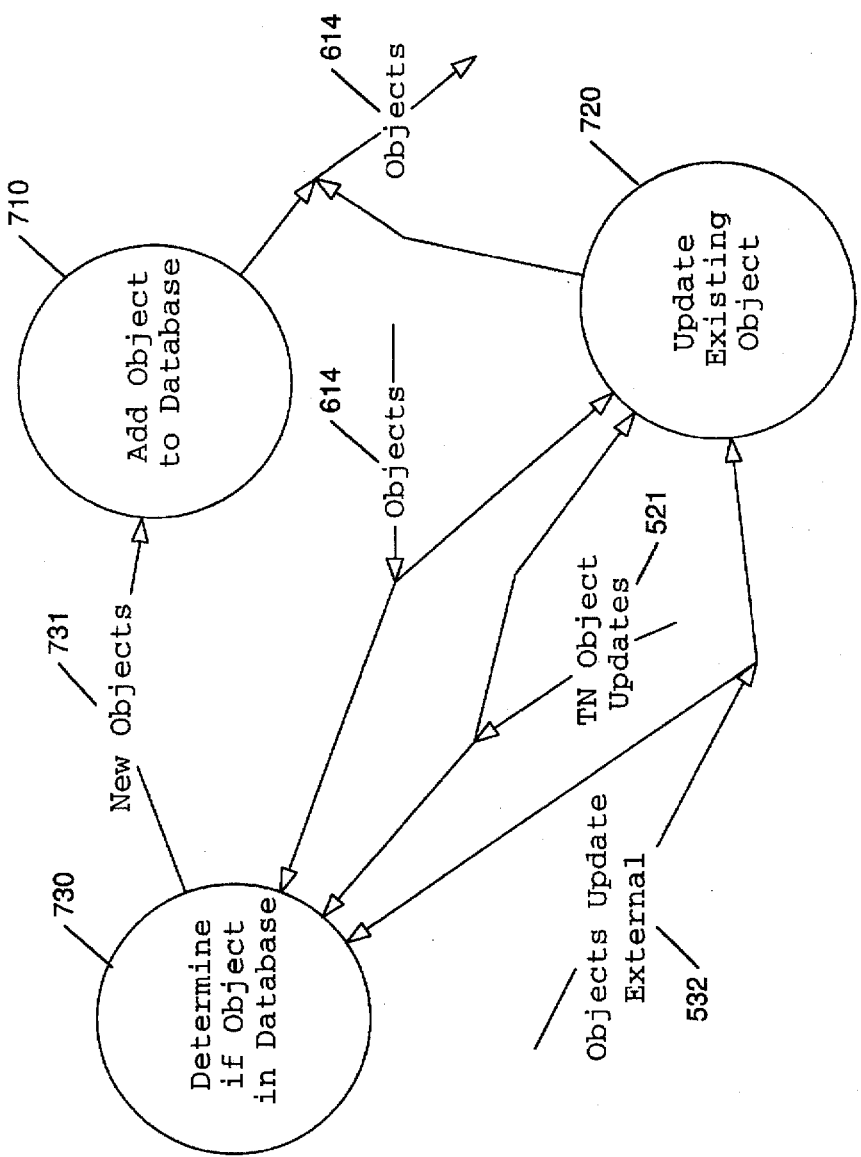
FIG. 7 is a data flow diagram of an update database process of the tracking node database management process of FIG. 6.

Referring now to FIG. 7, there is shown a data flow diagram of the database update process 610. In the update process 610, either a new object will be added to the database by an add object to database process 710, or an existing object will be updated by an update existing object process 720. The decision of whether to add a new object or update an existing object is performed by a determine if object in database process 730.

An object may be received by the determine if object in database process 730 from any of two sources: an external objects update data flow 532, or a TN object update data flow 521. The external object update data flow 532 transfers objects from the external tracking node interface 530 (FIG. 5); such objects comprise object sighting information received from other tracking nodes. These objects represent vehicles which are likely to enter the FOV of the sensor associated with this tracking node. The TN object update data flow 521 transfers objects from the local tracking process 520 (FIG. 5). These objects relate to vehicles which are in the FOV of the sensor associated with this tracking node.

In processing objects received from either data flow 521, 532, first, the determine if object in database process 730 determines whether or not an object to be updated exists in the database. If not, the object is termed a new object and the add object to database process 710 is invoked. This process 710 is responsible for formulating a new record for the database, initializing that record, attaching all of the identification criteria to identify that object to be associated with this particular node, and installing the new record in the database.

If the update object coming in from either the external objects update data flow 532 or the TN objects data flow 521 is found in the database, then this object, with new information developed from one of the feeding processes, is updated within the database itself by the update existing object process 720.

Local Tracking 520

Figure 8:
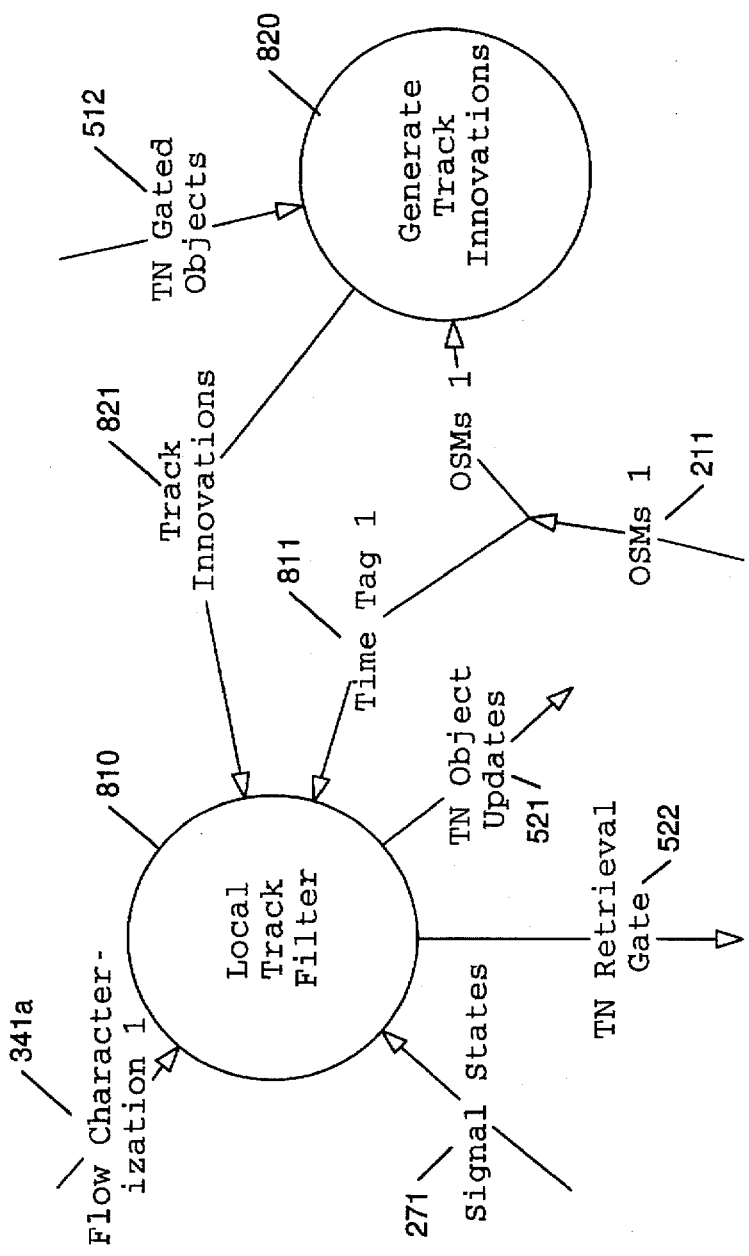
FIG. 8 is a data flow diagram of a local tracking process of the separated sensor FOVs tracking node of FIG. 5.

Referring now to FIG. 8, there is shown a data flow diagram of the local tracking process 520. Local tracking 520 includes a local track filter process 810 and a generate track innovations process 820. A track innovation is defined herein as the difference between a vehicle's measured location and the location predicted for the vehicle based upon the vehicle's track, local flow, and area flow. At a high level, the generate track innovations process 820 can be thought of as a function which analyzes the OSMs coming in from SSI 1 (210) on the OSMs 1 data flow (211) together with objects from the TN gated objects data flow 512. The generate track innovations process 820 correlates those two data sources into track innovations which are then transferred to the local track filter 810 by a track innovations data flow 821. The local track filter 810 uses the track innovations from the track innovations data flow 821 to produce the TN object updates data flow 521 for updating the database with the latest object information. Details on these two functions are given below.

Local Track Filter 810

Figure 9:
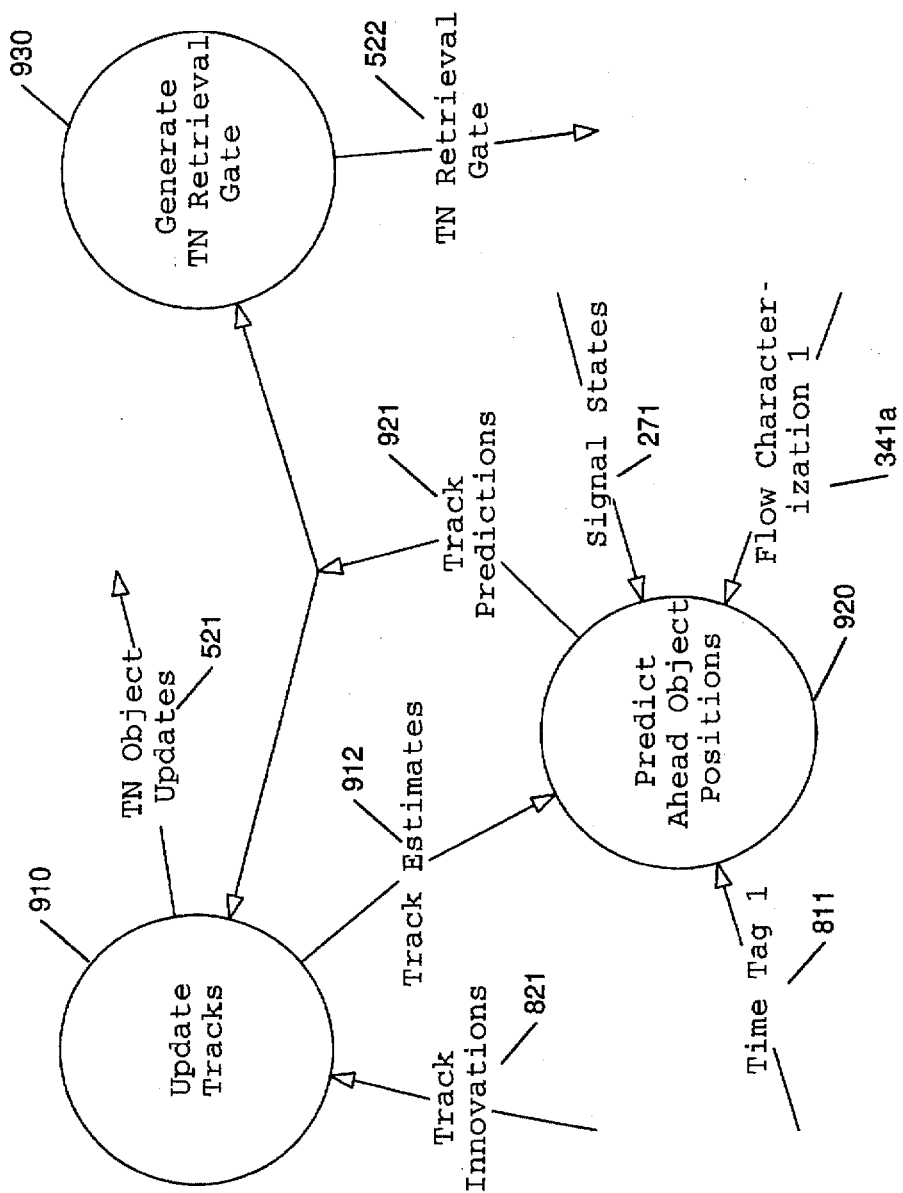
FIG. 9 is a data flow diagram of a local track filter process of the local tracking process of FIG. 8.

Referring now to FIG. 9, there is shown a data flow diagram of the local track filter 810. The local track filter 810 includes: an update tracks process 910, a predict ahead object positions process 920, and a generate TN retrieval gate process 930. The local track filter 810 is a predictor-corrector Kalman-like filter. The update tracks process 910 forms the correction part. The predictor part is implemented by the predict ahead object positions process 920. The measurement component of the Kalman loop is embedded in generation of the innovations which is supported by the generate TN retrieval gate process 930.

When a new OSM is received from SSI 1 (210), a time tag 1 data flow 811, which is extracted from the OSMs 1 data flow (211), holds the time used for prediction of all present tracks within the update tracks process 910. The predict ahead object positions process 920 predicts track positions (921) based upon: (a) track estimates transferred from the update tracks process 910 through a tracks estimates data flow 912, (b) characterization of the flow within the area of sensor 1 provided by the flow characterization data flow 341*a* from the top MATS layer 140, and (c) the signal states 271. These track predictions are based on a micro model for the vehicles within the field of view of sensor 1. Such micro models are described in W. Leutzbach, *Introduction to the Theory of Traffic Flow;* 1988; Springer-Verlag; Berlin, Germany and A. May, *Traffic Flow Fundamentals;* 1990; Prentice-Hall; Englewood Cliffs, N.J.; Chapter 6 which are incorporated herein by reference. Track estimates 912, signal states 271, and flow characterization 341*a* are inputs to this model. The model provides the track predictions 921 which are used in the next track update and for gating of the database retrieval.

Along with the predicted locations of each of the vehicles included in the track predictions data flow 921 are variance measures for these tracks which are also generated in the predict ahead object positions process 920. These variances are calculated using standard Kalman update procedures utilizing a variance for the track estimates which is included along with object information in the track estimates data flow 912 coming from the update tracks process 910. Such techniques are generally described in P. Maybeck, *Stochastic models, estimation, and control;* 1979; Academic Press; NY, N.Y.; Chapters 9, 10, and 12 of Volume 2 which is incorporated herein by reference.

Predicted track locations and their variances flow to the generate TN retrieval gate process 930 through the track predictions data flow 921. This process 930 is responsible for generating the TN retrieval gate data flow 522 which contains the specification for the retrieval sent to the tracking node database manager 510. The tracking node database manager 510 retrieves all vehicles (objects) specified by the TN retrieval gate message 522 and sends the objects through the TN gated objects data flow 512 to generate track innovation process 820 (FIG. 8). The generate TN retrieval gate process 930 defines the retrieval specification so that all objects within the tracking node database 640 which can be associated with the track predictions will be retrieved from the database.

The description of the update tracks process 910 is provided in the next section.

Update Tracks 910

Figure 10:
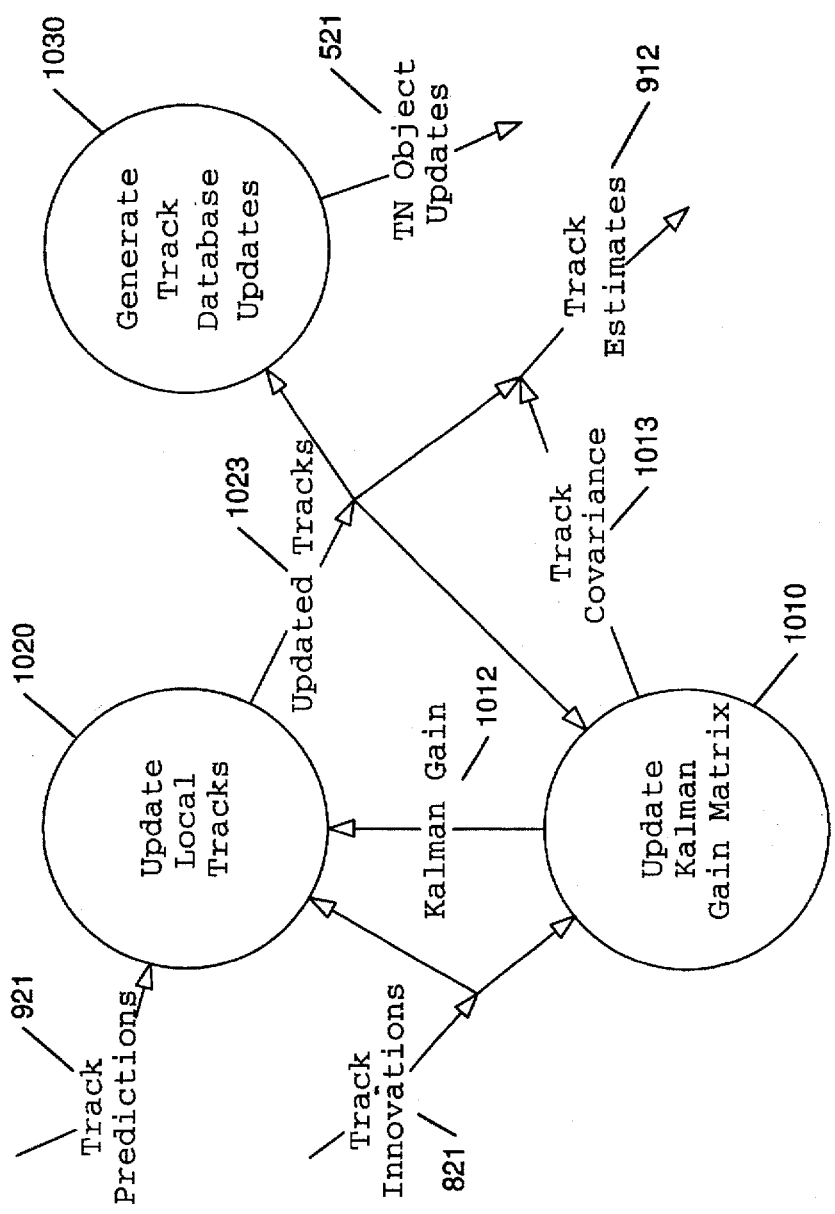
FIG. 10 is a data flow diagram of an update tracks process of the local track filter of FIG. 9.

Referring now to FIG. 10, there is shown a data flow diagram of the update tracks process 910. The update tracks process 910 includes an update local tracks process 1020 which implements a Kalman-like update strategy. The update local tracks process 1020 utilizes track innovations transferred by the track innovations data flow 821 and Kalman gain calculations transferred through a Kalman Gain data flow 1012 provided by an update Kalman gain matrix process 1010 to correct the track predictions, thus obtaining the updated tracks data flow 1023. A quality measure for each innovation is developed in the generate track innovations process 820 (FIG. 8) and is included in the track innovations data flow 821. The quality measure or probability of correct assignment is utilized by the update local tracks process 1020 during the track updates. Quality measure and probability of correct assignment are described in P. Maybeck, *Stochastic models, estimation, and control;* 1979; Academic Press; NY, N.Y.; Chapters 9, 10, and 12 of Volume 2; and Y. Bar-Shalom and T. Fortmann; *Tracking and Data Association;* 1988; Academic Press, San Diego, Calif. which are incorporated herein by reference. For example, if the probability of a correct assignment is low then the resulting innovation for this track would be lightly weighted compared to innovations having a high probability of correct assignment. This process also contains track splitting and track merging logic to handle the case of unresolved vehicles within the sensor's FOV.

The update Kalman gain matrix process 1010 generates both the Kalman gain 1012 utilized in the update local tracks process 1020 and track covariance matrices 1013 which is included in the track estimate data flow 912. The update Kalman gain matrix process 1010 and the track covariance data flow 1013 can be computed using the extended Kalman filter update strategy and the innovation quality measures. Such computations are described in P. Maybeck, *Stochastic models, estimation, and control;* 1979; Academic Press; NY, N.Y.; Chapters 9, 10, and 12 of Volume 2; and Y. Bar-Shalom and T. Fortmann; *Tracking and Data Association;* 1988; Academic Press, San Diego, Calif.; Section 9.4 which are incorporated heroin by reference. The updated Kalman gain 1012 is utilized in the update local tracks process 1020 for the updating tracks on the next set of OSMs. messages.

The generate track database updates process 1030 takes the updated tracks including their confidence measures and generates the message for updating or refreshing the database. This message is sent out on the TN objects updates data flow 521 to the database. A typical TN objects update message preferably contains for each object addressed by the update tracks process 910 the following information: track ID, updated vehicle classification, updated vehicle position, velocity, and acceleration, lane or pseudo lane(s) vehicle determined to be in, updated vehicle attributes, updated track quality, track characteristics, and vehicle behavior.

The generate track database updates process 1030 takes the other information developed by the generate track innovations process 820 and included in the track innovations data flow 821 that was not utilized in the track update and updates the database with it. This information includes:

(1) new objects not associated with existing tracks;

(2) track splits and track merges;

(3) multiple models and multiple track hypothesizes; and (4) other possibilities extracted during the assignment operation.

Generate Track Innovations 820

Figure 11:
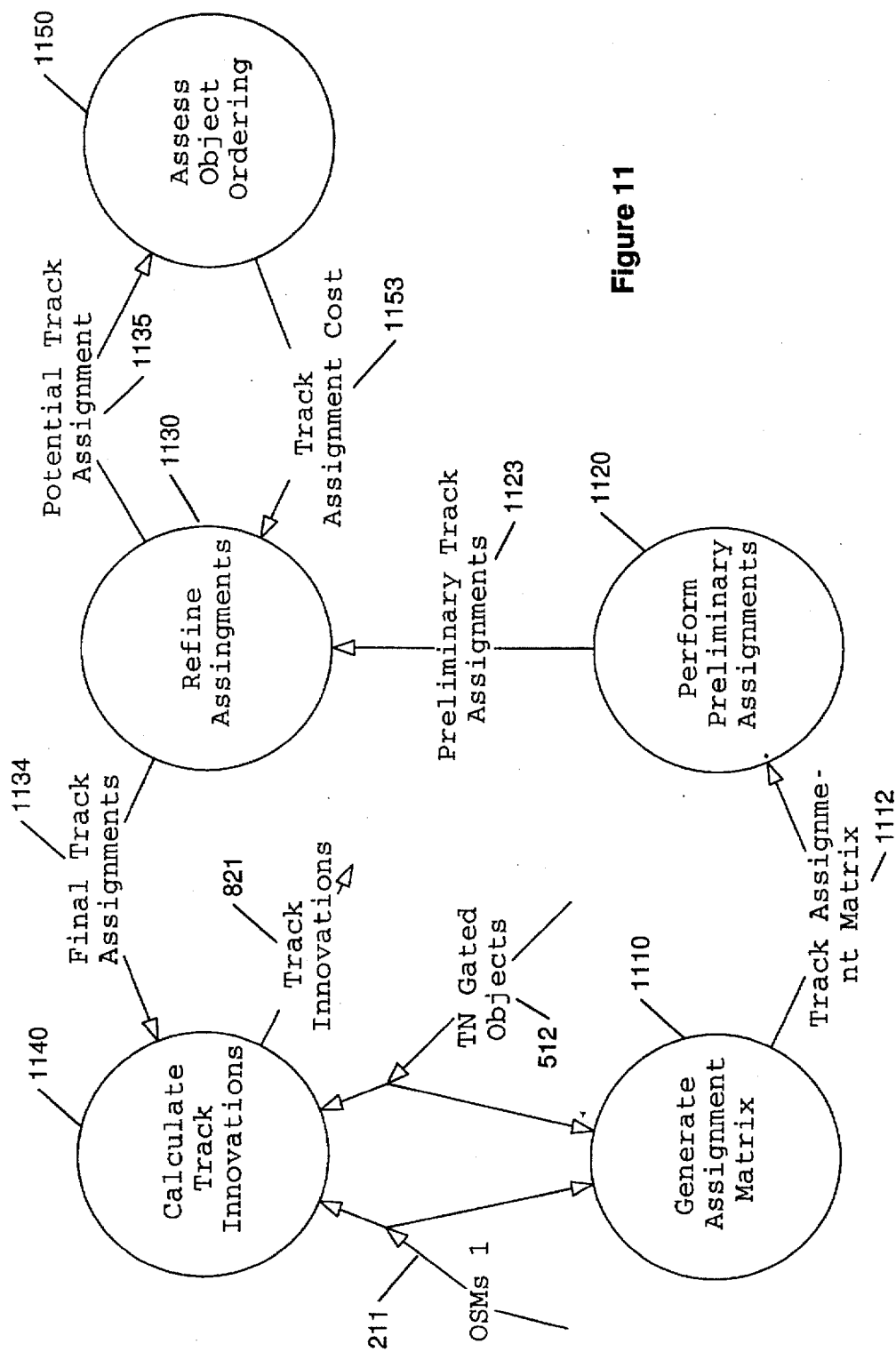
FIG. 11 is a data flow diagram of a generate track innovations process of the local tracking process of FIG. 8.

Referring now to FIG. 11, them is shown a data flow diagram of the generate track innovations process 820. This function 820 is composed of five processes which operate on OSMs from SSI 1 (210) on the OSMs 1 data flow 211, and on the TN gated objects 512 retrieved from the database. These processes include a generate assignment matrix process 1110, a perform preliminary assignments process 1120, a refine assignments process 1130, a calculate track innovations process 1140, and an assess object order process 1150. The generate track innovations process 820 correlates object data sources through a data association algorithm in order to calculate the track innovations used in the update tracks process 910. Data association algorithms are described in Y. Bar-Shalom and T. Fortmann; *Tracking and Data Association;* 1988; Academic Press, San Diego, Calif. which is incorporated herein by reference.

Track innovations are used for updating or correcting the tracks by the update tracks process 910 (FIG. 9). In order to generate track innovations, objects from the OSMs 1 data flow 211 are first associated with (assigned to) TN gated objects from the tracking node database manager 510 transferred through the TN gated objects data flow 512 (FIG. 5). The first step in producing track innovations is the generation of an assignment matrix in the generate assignment matrix process 1110. Assignment matrices are described in S. Blackman, *Multiple-Target tracking with Radar Applications;* 1984; Artech House; Norwood, Mass.; Chapter 4, which is incorporated herein by reference. The generate assignment matrix process 1110 generates an array which measures the distance (feature distance) between each object in OSMs 1 and each object in TN gated objects 512. The result is a track assignment matrix which is transferred through the track assignment matrix data flow 1112 to the perform preliminary assignments process 1120.

Each element of the assignment matrix contains the distance between an object from OSMs 1 (211) and an object transferred by the database manager 510 from the TN gated objects data flow 512. The distance can be a standard distance measure typically utilized in multitarget tracking which measures the similarity of two objects based on object attributes and locations. Vehicle tracking is in one sense simpler than classical multi-target tracking, because vehicles do not easily change their order as they go though the FOV of a sensor. That is, if vehicle A leads vehicle B at the time of one sensor's output sample, then vehicle A is more likely to lead vehicle B at the time of a later sensor's output sample. On the short term, the order of vehicles on the roadway tends to remain constant. This can be a significant source of information to be utilized in the association process. One way to utilize this information is to compare the objects before and after within the same lane in generating the distance measure. Hence, the time difference between the object and the preceding and post object, along with their attribute distances, are also utilized in generating the distance which is included in the track assignment matrix.

The completed assignment matrix is included in the track assignment matrix data flow 1112 which is transferred to the perform preliminary assignments process 1120. This process 1120 utilizes information in the track assignment matrix to generate an initial or preliminary assignment of vehicles identified in the OSMs 1 data flow 211 and the TN gated objects data flow 512. Since for a single sensor's FOV, the number of objects is relatively small, an optimal assignment algorithm can be utilized to perform preliminary assignments process 1120. Assignment algorithms are described in J. Munkres, Algorithms for the Assignment and Transportation Problems; SIAM J. Control; Volume 5, March, 1957, pp 32-38 which is incorporated herein by reference. The resulting assignments and the assignment matrix are placed on a preliminary tracking assignments data flow 1123 and transferred to the refine assignments process 1130.

As explained above, the perform preliminary assignments process 1120 utilizes an assumption on the order of vehicles within a lane. This assumption is reflected in the preliminary trade assignments. The assumption is that the vehicle order remains exactly the same from OSMs 1 to TN gated objects. This is not always true, especially in situations where lane changing can occur. The possibilities of lane changing need to be assessed, and the assignments need to be modified if it is determined that lane changing has occurred. An approach to this is to form multiple models for the vehicle's path, each model representing one possible path. On a roadway there are a limited number of possible paths which makes this approach practical. Based on this multiple model representation a multiple hypothesis tracking filter can be utilized. Multiple models and their use are described in Y. Bar-Shalom and T. Fortmann; *Tracking and Data Association;* 1988; Academic Press, San Diego, Calif.; Section 4.3 and 7.4 which is incorporated herein by reference.

The preliminary tracking assignments flowing from the perform preliminary assignments process 1120 into the refine assignments process 1130 form a starting point to assess whether or not the object ordering is correct or whether lane changing has or could have occurred. Thus, a multiple model representation is required. The refine assignments process 1130 assesses the possibility of lane changing or order changes within the flow of objects. The refine assignments process 1130 is implemented by generating heuristically the set of possible alternative assignments (hypotheses) which are different than the preliminary track assignments. These are referred to as multiple hypotheses. These potential or different hypotheses are transferred to an assess object ordering process 1150 through a potential track assignment data flow 1135. The assess object ordering process 1150 assesses the quality or the "goodness" of that alternate hypothesis and returns back to the refine assignments process 1130 the track assignment cost or the quality of that potential hypothesis. Logic within the refine assignments process 1130 then selects from the set of hypotheses the best hypothesis, forming a final track assignments data flow 1134. For each object within the OSMs 1 data flow 211 or the TN gated objects data flow 512, the refine assignments process 1130 will select from the following list of possibilities:

(1) a single assignment (i.e. one object to one existing track);

(2) a null assignment (i.e. the object associates with no other object, it is a new object);

(3) merged object (i.e. the object has merged with other objects);

(4) split track (i.e. the object has broken away from another object with which it was merged);

(5) multiple model object(s) (i.e. the object could be continued on more than one path thus requiring the tracker to carry multiple models for this object); or (6) extinguished track (i.e. object(s) can no be associated with this track).

The calculate track innovations process 1140 calculates track innovations for the update tracks process 910 based upon the final track assignments. Based on the final assignments, the calculate track innovations process 1140 computes a probability of correct assignment which is attached to each of the innovations and flows out on the track innovation data flows 821 to the update tracks process 910. For objects for which multiple models am being maintained, the calculate track innovations process 1140 calculates an innovation for each model. For the other objects this process 1140 transfers the information to the track innovations data flow 821 that is needed for the generate track database updates process 1130.

External Tracking Node Interface 530

Figure 12:
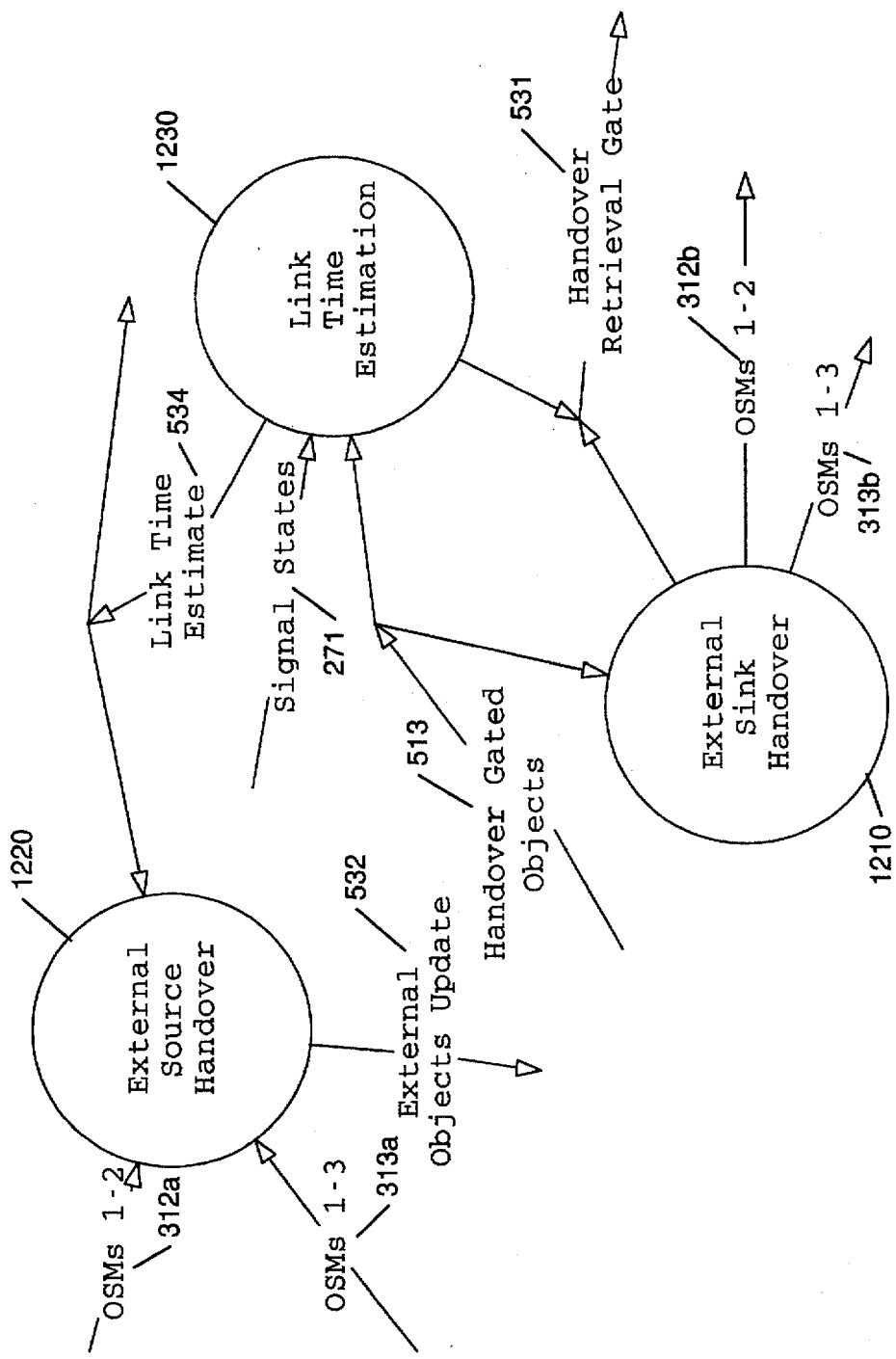
FIG. 12 is a data flow diagram of an external tracking node interface of the separated sensor FOVs tracking node of FIG. 5.

Referring now to FIG. 12, there is shown a data flow diagram of the external tracking node interface 530 discussed with reference to FIG. 5. This process includes an external sink handover 1210, an external source handover 1220, and a link time estimation process 1230. Two of the processes, the external sink handover 1210 and the external source handover 1220, handle formatting and extraction of data from the database. The link time estimation process 1230 performs processing needed to support an extraction function of the external source handover 1220.

The external sink handover 1210 is responsible for analyzing the database, detecting when an object is leaving sensor 1 FOV (2310), and determining based on the object's track, whether or not the object is on a lane or pseudo lane that will take it into the FOV of one of the other sensors. If that object can geometrically transition over the road system and get to one of the other sensors, then the external sink handover 1210 extracts the object from the database, formats it, and sends it to the appropriate tracking node where it can be later picked up, associated, and placed into a track as it goes through the FOV of that sensor.

The external sink handover 1210 operates in a background mode generating handover retrieval gate specifications through the handover retrieval gate data flow 531 to the tracking node database manager 510. The database manager 510 retrieves the objects, as explained above, and transfers the gated objects back to this process 1210 through the handover gated objects data flow 513. Then the external sink handover process 1210 analyzes these gated objects to see if they meet the requirements for a handover to another tracking node. For example, if an object is detected to be in the sensor 1 FOV (2310) on a path that will take the vehicle to sensor 3, then the external sink handover 1210 of tracking node 1 routes an OSM to tracking node 3 (330) so that the vehicle track can be continued as the vehicle enters the sensor 3 FOV (2330). If the vehicle was predicted to enter sensor 3 FOV (2330), the external sink handover 1210 estimates when the vehicle crossed the registration point for sensor 1 and attaches this time tag along with the ID of sensor 1 to the OSMs 1–3 data flow 313b.

OSMs, produced by other tracking nodes, that have been determined or that can be associated with a roadway path that will take the vehicle or object within the FOV of sensor 1 are transferred on the data flow from that sensor's tracking node to tracking node 1. These data items enter the external data source handover 1220 of tracking node 1, which places these new objects into the database where they can later be involved in the tracking activity as they come within the sensor 1 FOV. The external source handover 1220 is also responsible for updating these objects with the latest link time information transferred from the link time estimation process 1230 so that the time of arrival within the sensor 1 FOV can be predicted.

The link time estimate is developed in the link time estimation process 1230. The link time estimate estimates how long an object takes to proceed from the FOV of one sensor to the FOV of another, for example where an object proceeds from the FOV of sensor 1 to the FOV of sensor 3. When that object is sent to tracking node 3 (330) through the OSMs 1–3 data flow 313b, the external source handover of tracking node 3 attaches the latest link time estimate to the object. As the link time estimate is improved, the external source handover of tracking node 3 uses it to update the vehicle's predicted time of arrival in the sensor 3 FOV. In this manner the database retrieval system can retrieve these objects at the time that the object would appear in the sensor 3 FOV for correlation with OSMs 3 from sensor 3.

The link time estimation process 1230 generates handover retrieval gates transferred through the handover retrieval gate data flow 531 and receives handover gated objects through the handover gated objects data flow 513 to generate the link time estimate associated with that data. It also receives the signal states 271 which are useful if link time is being influenced through area control 270. The detailed functionality estimation link time estimation process is described below.

Link Time Estimation 1230

Figure 13:
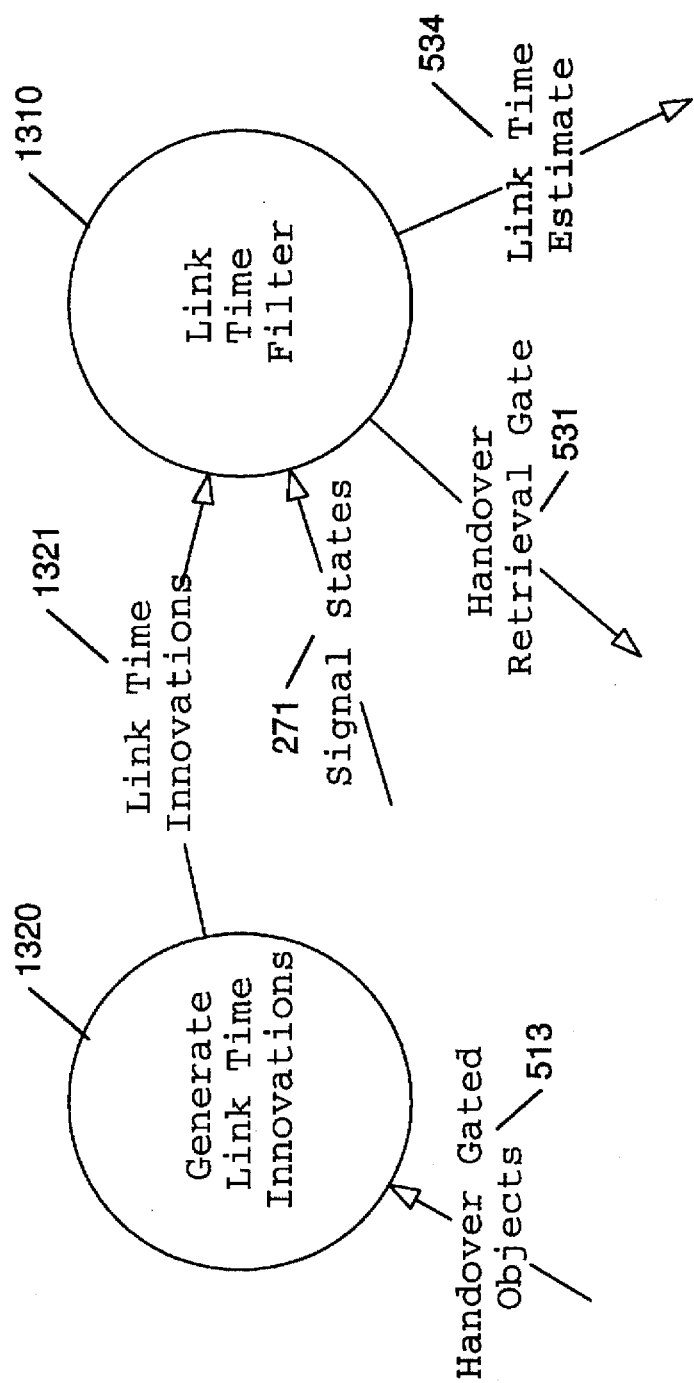
FIG. 13 is a data flow diagram of a link time estimation process of the external tracking node interface of FIG. 12.

Referring now to FIG. 13, there is shown a data flow diagram for link time estimation 1230. Link time estimation 1230 can be implemented in a similar manner as was used for the local tracking process shown in FIG. 8. This is because link time is a measure of the time elapsed in a vehicle's movement from one sensor's FOV to a second sensor's FOV, where as track time is a measure of the time elapsed in a vehicle's movement from one point to another in a single sensor's FOV. Link time estimation utilizes two functions. The first function, the link time filter 1310, performs the link time filtering based on link time innovations. The other process, generate link time innovations 1320, generates these link time innovations. The generate link time innovations process 1320 transfers the link time innovations to the link time filter 1310 through a link time innovations data flow 1321. Together, these two processes implement a Kalman-like predictor-corrector cycle.

Link Time Filter 1310

Figure 14:
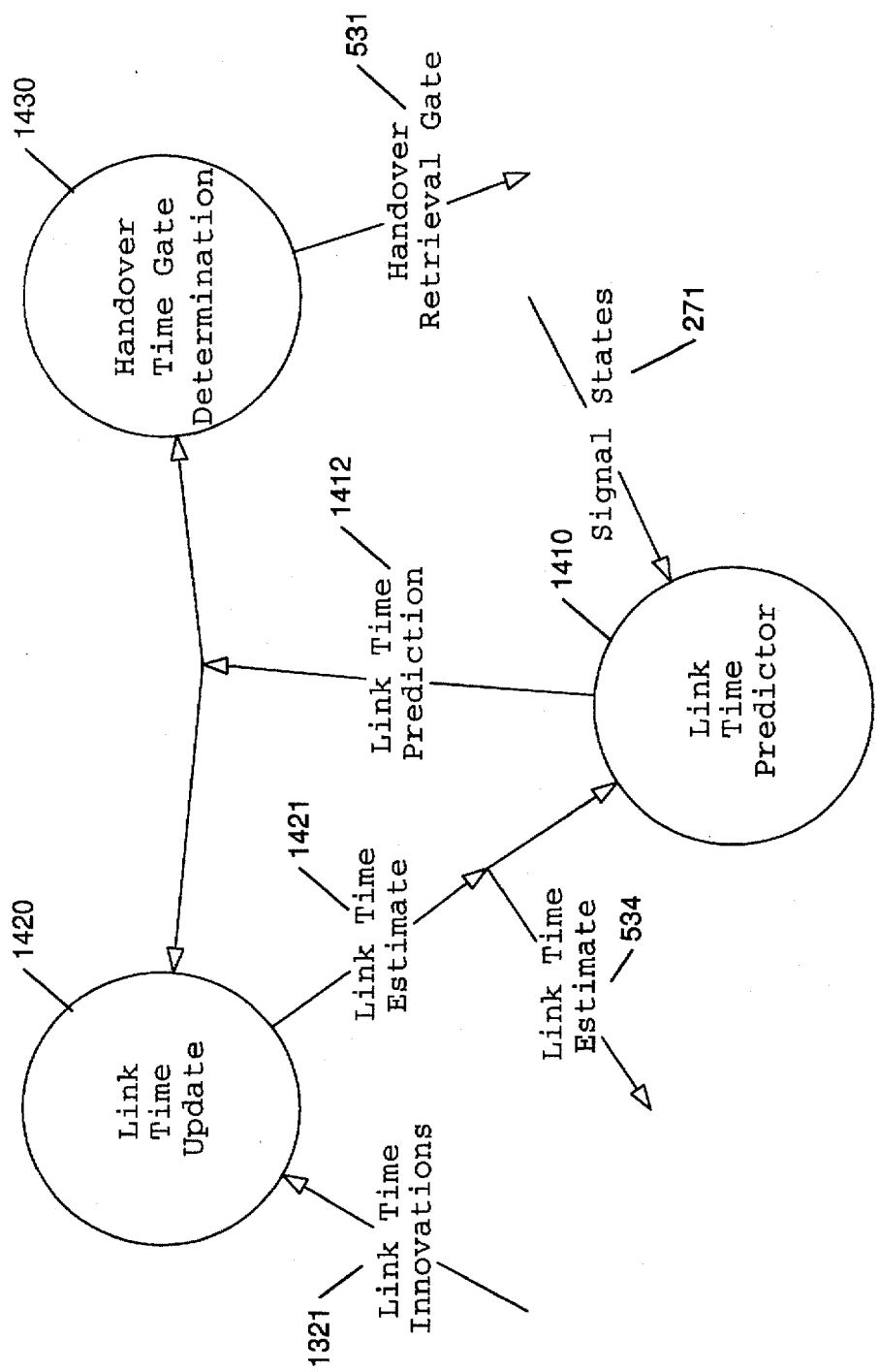
FIG. 14 is a data flow diagram of a link time filter process of the link time estimation process of FIG. 13.

Referring now to FIG. 14, there is shown a data flow diagram for the link time filter 1310. Comparing this diagram with the local track filter of FIG. 9 shows that the same basic steps of the local track filter 810 are also implemented in the link time filter 1310. Link time is predicted by a link time predictor 1410 based on past link time estimates utilizing a dynamic model, and the signal states transferred through the signal states data flow 271 where appropriate. Use of dynamic models is described in W. Leutzbach, *Introduction to the Theory of Traffic Flow;* 1988; Springer-Verlag; Berlin, Germany; Section II.2.6.2.6 which is incorporated herein by reference. The predicted link time, including link time variances, is sent both to a link time update process 1420 and a handover time gate determination process 1430 through a link time prediction data flow 1412.

The handover time gate determination process 1430 utilizes the predicted link time and variances to develop a retrieval specification for retrieving handover data from the database. The retrieval gates are transferred by the handover retrieval gate data flow 531 to the database manager 510. A simple time gate based on the predicted link time plus or minus several standard deviations can be used for the handover time gate determination process 1430. Time gates are described in S. Blackman, *Multiple-Target tracking with Radar Applications;* 1984; Artech House; Norwood, Mass.; Chapter 4 which is incorporated herein by reference. Next, the database manager 510 transfers the handover gated objects to the generate link time innovations process 1320, as described above. Subsequently, the generate link time innovations process 1320 generates link time innovations and transfers them to the link time update process 1420 through the link time update process data flow 1321. The link time update process 1420 performs the link time update using a predictor-corrector strategy based on the predicted link time corrected by the measured innovations. Thus the link time filter is similar to the local track filter (FIG. 9) described earlier.

Generate Link Time Innovations 1320

Figure 15:
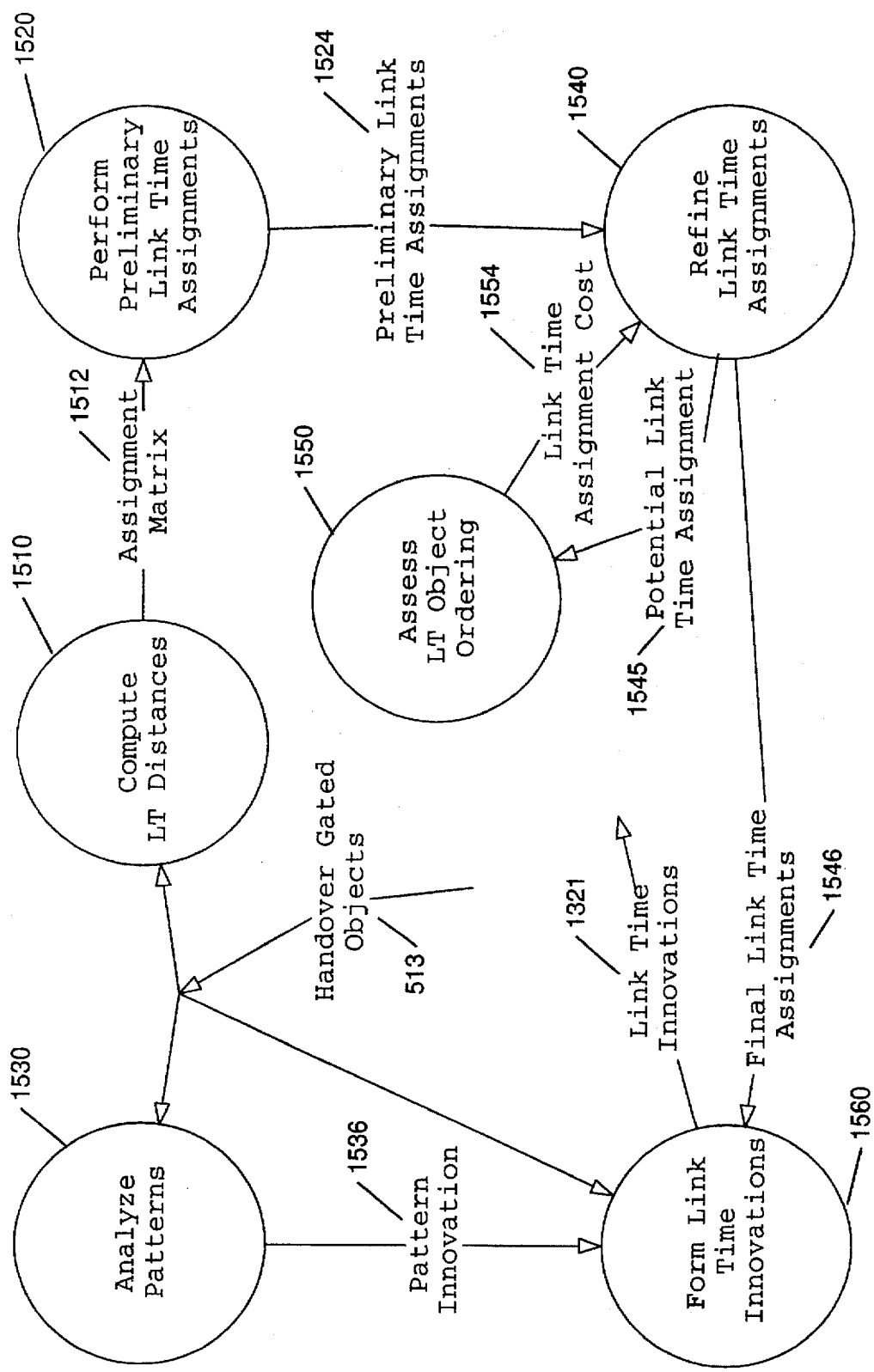
FIG. 15 is a data flow diagram of a generate link time innovations process of the link time estimation process of FIG. 13.

Referring now to FIG. 15, there is shown a data flow diagram of the generate link time innovations process 1320. This process 1320 produces the link time innovation needed for estimating the link time by the link time filter 1310 and shown in FIG. 14. The processing approach of the generate link time innovations process 1320 is similar to the generate track innovations process shown in FIG. 11 which is employed to generate the track innovations. A major difference is that pattern analysis is performed in generating the track innovations in the generate link time innovations process 1320.

As discussed above, the objects found in the database matching the handover retrieval gate specification generated by the link time filter 1310 and FIG. 14 arrive on the handover gated objects data flow 513. Objects in the handover gated objects data flow 513 originate from the tracking node on the other side of the link through which the vehicle is travelling and contain the time tag corresponding to when the object crossed the registration point for the sending sensor. Another set of objects retrieved correspond to objects within this sensor's FOV (i.e. sensor 1 FOV) that are currently under track in tracking node 1 (310). Link time information is developed by correlating these two information streams.

The generate link time innovations process 1320 includes: a compute link time distances process 1510; a perform preliminary link time assignments process 1520, an analyze patterns process 1530, a refine link time assignments process 1540, an assess link time object ordering process 1550, and a form link time innovations process 1560.

To estimate link time, first handover gated objects, (i.e. objects relating to the vehicle from the different sensors) are associated. This is performed based on a distance computation similar to the function performed by the generate assignment matrix process 1110 (FIG. 11). The handover gated objects are received by the compute link time distance process 1510 which outputs an assignment matrix for the objects through an assignment matrix data flow 1512. The compute link time distance process 1510 computes distance information to derive order information, and utilizes this order information as is done in the generate assignment matrix process 1110.

A preliminary assignment between these object sources is performed by a perform preliminary link time assignments process 1520 based on the assignment matrix. The same assignment approach as was used in the generate track innovations process 820 and FIG. 11 can be used by the perform preliminary link time assignments process 1520. Since the number of potential assignments is not large, an optimal assignment algorithm can be used without significant computational cost. Such algorithms are described in J. Munkres, Algorithms for the Assignment and Transportation Problems; SIAM J. Control; Volume 5, March, 1957, pp 32–38 which is incorporated herein by reference. As in the generate track innovations process 820, due to lane changing and other mechanisms which can affect the object order, the assignments must be refined to account for changes in the object's order. This functionality is accomplished in the refine link time assignments process 1540 in conjunction with the assess link time object ordering process 1550. This refinement can be accomplished through a multiple hypothesis tracking approach similar to that used in the generate track innovations process (FIG. 11). Hence, the assess link time object ordering process 1550 assesses whether or not the object ordering is correct as initially determined in the perform preliminary link time assignments process 1520 or if subsequently refined link time assignments (in the refine link time assignments process 1540) are a better representation of the flow. The refine link time assignments process 1540 receives the preliminary link time assignments data flow 1524 from the perform preliminary link time assignments process 1520 through a preliminary link time assignments data flow. Potential link time assignments are transferred by a potential link time assignment data flow 1545 to the assess link time object ordering process 1550, which passes its assessment of the potential assignment track to the refine link time assignments process 1540 through a link time assignment cost data flow 1554. The result is a final link time assignments data flow 1546 that is sent to the form link time innovations process 1560.

The final link time assignments data flow 1546 contains information at a vehicle by vehicle level. Other information for generating link time innovations is vehicle platoon or pattern innovations transferred through a pattern innovation data flow 1536. Vehicle platoon tracking is described in E. Pfannerstill, Automatic Monitoring of Traffic Conditions by Reidentification of Vehicles. In Proc. IEEE Conf. on Road Traffic Monitoring, Report 299, 1989, pp. 172–175 which is incorporated herein by reference. Platoons are identifiable clumps or groups of vehicles. Clumps of vehicles can be correlated from one sensor to another to generate link time innovations. The analyze patterns process 1530 performs the pattern or platoon analysis to produce an innovation based on platoon information. This is done by correlating clumps of objects located in sensor 1 FOV with clumps of objects coming from other sensors for which the link time is being estimated. The objects are received by the analyze patterns process 1530 through the handover gated objects data flow 513. The difference between when a clump of objects has been spotted in sensor 1 FOV and when it was predicted to occur from another sensor is the pattern innovation. A sliding window correlation approach can be utilized by the analyze patterns process 1530 to generate the pattern innovation. The analyze patterns process 1530 transfers the pattern innovations through a pattern innovation data flow 1536.

The form link time innovations process 1560 produces a link time innovation data flow 1321. The form link time innovations process 1560 produces this data flow by combining the information in the final link time assignments data flow 1546 and the pattern innovations in the pattern innovation data flow 1536 by first taking the link time assignments for the refine link time assignments process 1540, extracting the time tags for each object assigned from the handover gated objects data flow 513 and forming the innovation from the object time tags. The predicted link time estimate used to compute the innovations is included in the handover gated objects data flow 1540. This forms one set of innovations, those obtained by the object assignments. The pattern innovation from the analyze patterns process 1530 and the assignment and pattern innovation quality, computed in the form link time innovations process 1560, make up the link time innovations data flow 1321.

Overlapping Sensor FOV Tracking Node 420

Figure 16:
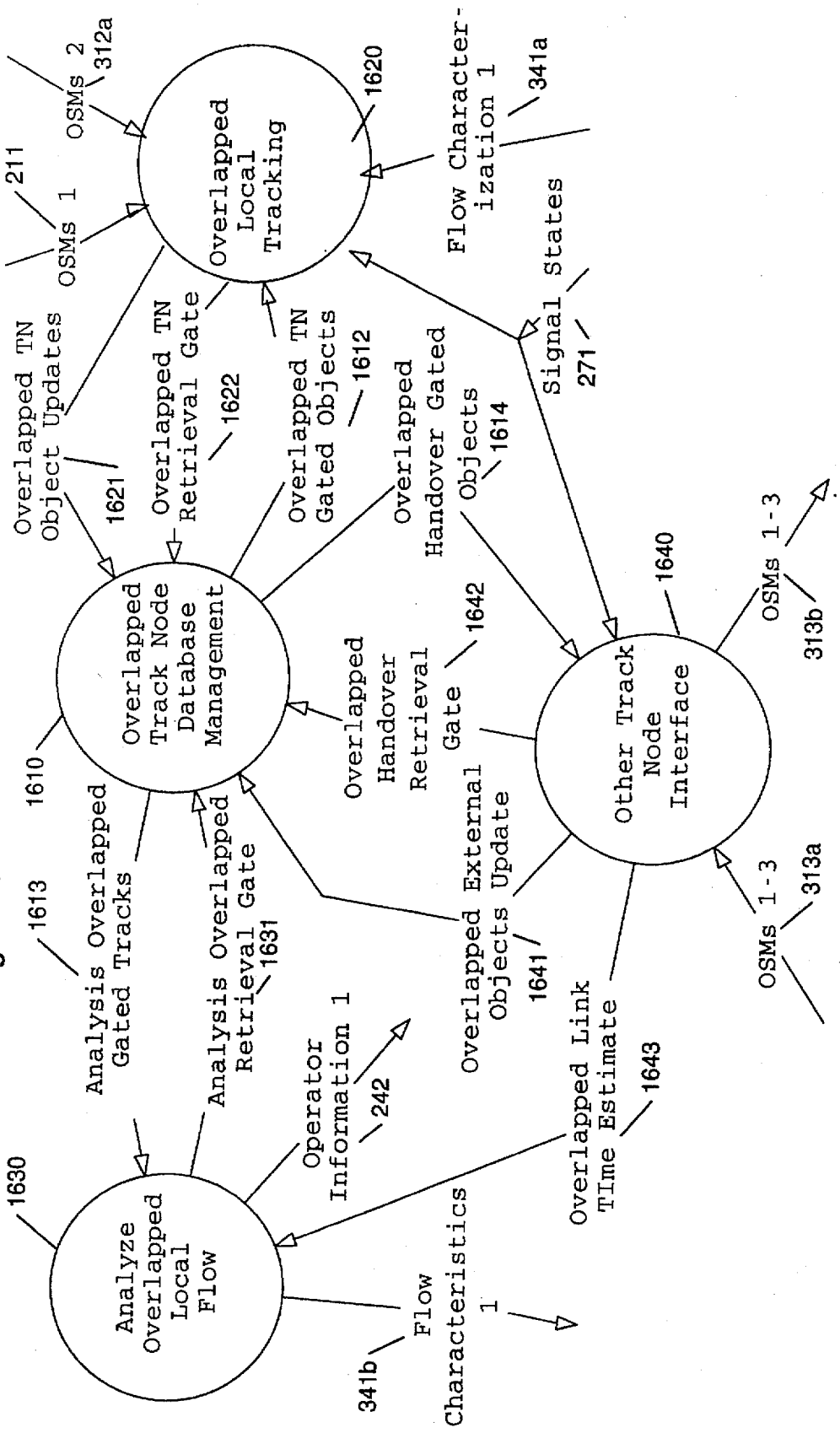
FIG. 16 is a data flow diagram of an overlapping sensor FOVs tracking node of the tracking node of FIG. 4.

Referring now to FIG. 16, there is shown a data flow diagram of the overlapping sensor FOVs tracking node 420. This process 420 addresses the case where two sensors have FOVs which are overlapping or are in close relationship to each other. An example of this is when several sensors are used to monitor a merge lane as in FIG. 23. Overlapped sensor FOVs are treated by the wide area surveillance system according to the present invention as a "group" in the sense that a single tracking function is used to process all OSMs from the overlapped sensors. This is accomplished by assigning one tracking node to the tracking activity and the other overlapped tracking nodes to relay points which send OSMs to the assigned tracking node. In FIG. 23, it is shown that sensor 1 and sensor 2 have overlapped FOVs. For the sake of an example, it will be assumed that tracking node 1 (310) has been assigned the tracking activity and tracking node 2 (320) relays OSMs from SSI 2 to tracking node 1 (310).

The processing approach for tracking node 1 (310) is similar to the case where the sensors have separated FOVs, with minor exceptions. Like with the separated sensor FOVs tracking node 410 (FIG. 4 and FIG. 5), there are four processes making up the overlapped sensor FOVs tracking node 420. These include a database function 1610 which is the heart of this tracking node, an overlapped local tracking process 1620, an interface to other nodes 1640, and an analysis of the local flow process 1630. Corresponding functions are found in the separated sensor FOVs tracking node 410. The functionality of the analyze overlapped local flow process 1630 is identical to the analyze local flow process 540 and the database manager 1610 is identical to the tracking node database manager 510 described with respect to FIG. 5.

Minor differences exist between the overlapped local tracking process 1620 and the local tracking process 520 (FIG. 5). Similarly, minor differences exist between the other tracking node interface 1640 and the external tracking node interface 530 (FIG. 5). The primary difference is that OSMs produced by SSI 2 are routed directly into the overlapped local tracking process 1620, along with the OSMs from the SSI 1. Tracking node 2 (320) is simply a routing mechanism for this example. OSMs 2 go into tracking node 2 (320) and are immediately routed on OSMs 1-2 (312) to tracking node 1 (310) which reassigns them (see FIG. 4) as OSMs 2 at the input to the overlapped local tracking process 1620. The functionality of the overlapped local tracking process 1620 is otherwise the same as that of the local tracking process 520, with the exception that there are two sources of OSMs instead of a single source.

The other process on this diagram, the other tracking node interface 1640, has the same functionality as the external tracking node interface 530, with the exception that the OSMs 1-2 (312) data flow has not been included since it is transferred into the overlapped local tracking process 1620.

Overlapped Local Tracking 1620

Figure 17:
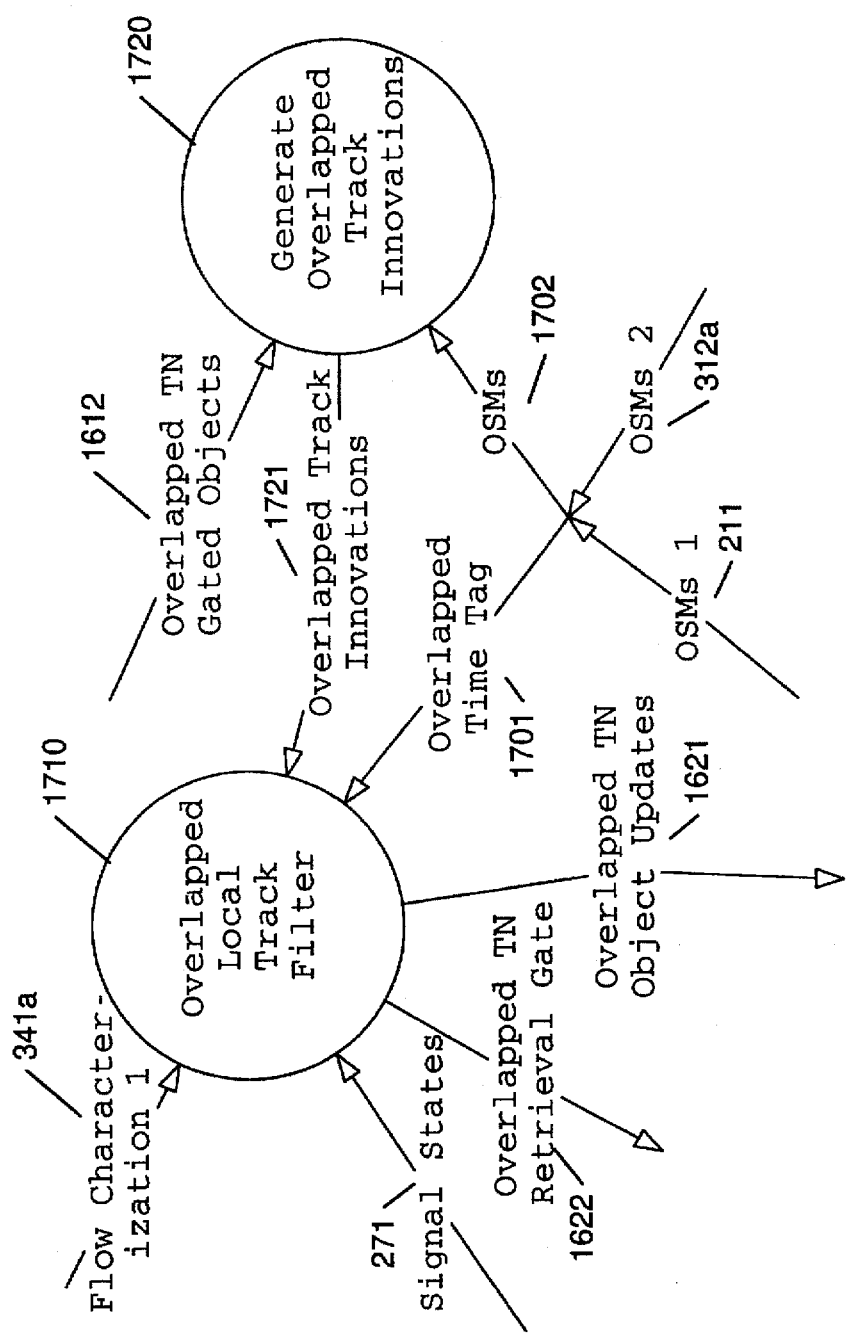
FIG. 17 is a data flow diagram of an overlapped local tracking process of the overlapping sensor FOVs tracking node of FIG. 16.

Referring now to FIG. 17, there is shown a data flow diagram of the overlapped local tracking process 1620. This process 1620 includes: an overlapped local tracking filter 1710, and a generate overlapped track innovations process 1720. The overlapped local track filter 1710 has exactly the same functionality and produces the same data as the local track filter 810 (FIG. 8). The generate overlapped track innovations process 1720 is also the same functionality as the generate track innovations process 820 (FIG. 8), except that the all of the overlapped OSMs from tracking node 2 are transferred into this process rather than just OSMs 1.

In an intersection, complex vehicle paths are likely. It would not be uncommon for a vehicle to have several possible future paths. If for example the vehicle was entering the intersection it could go straight, turn left, turn right, or make a U-turn. The overlapped local tracking process 1620 assigns a model to each of these alternatives (multiple models) and uses the multiple hypothesis filter tracking approach.

Other Tracking Node Interface 1640

Figure 18:
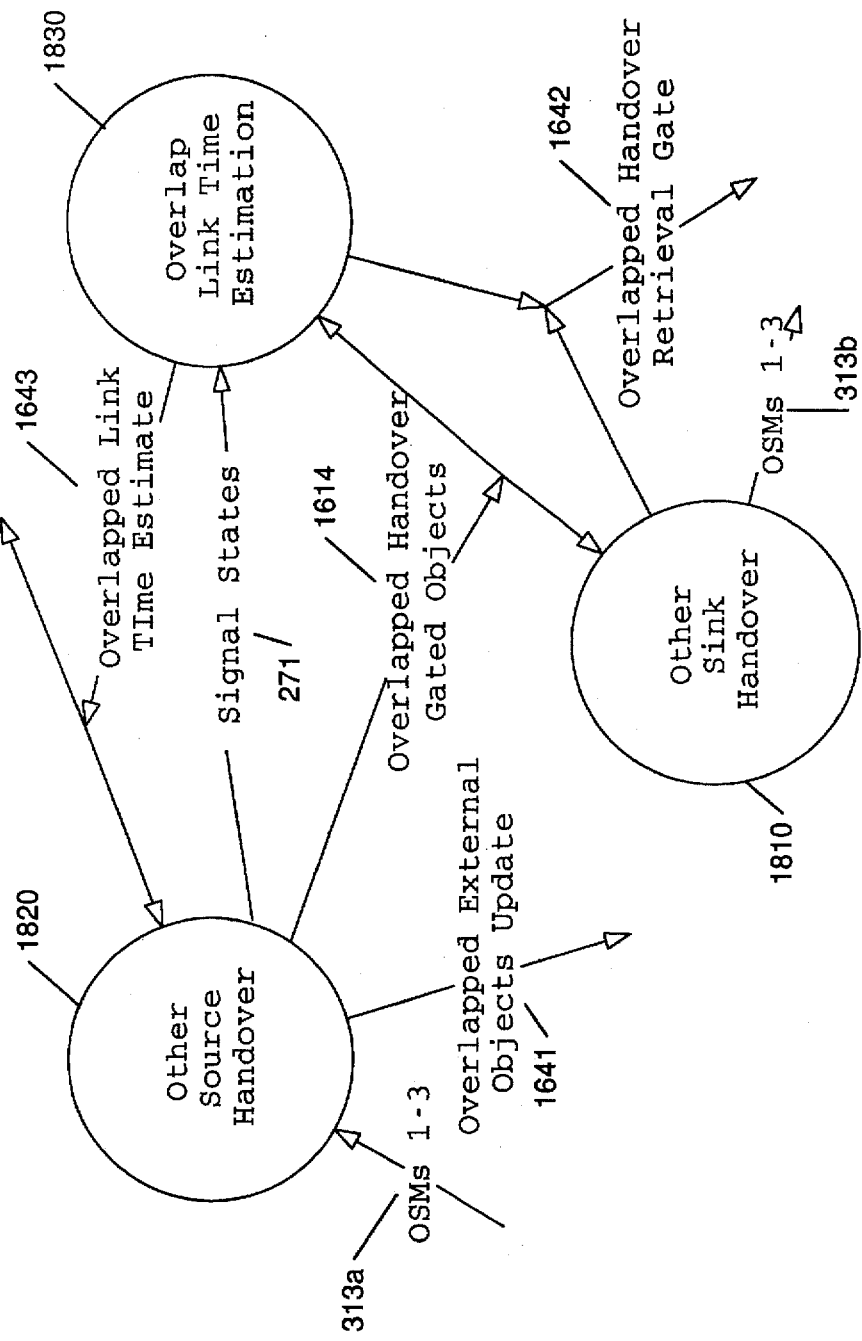
FIG. 18 is a data flow diagram of an other tracking node interface process of the overlapping sensor FOVs tracking node of FIG. 16.

Referring now to FIG. 18, there is shown a data flow diagram for the other tracking node interface 1640. This process includes: an other sink handover 1810, an other source handover 1820, and an overlap link time estimator 1830. The functionality for these three processes are almost identical to the functionality of the three processes in FIG. 12, with the following exceptions. The OSMs 1 from-2 data flow (312) is absent because the sensor 2 FOV overlaps sensor 1 FOV. Consequently, there is not a need for external sink and source handovers with tracking node 2. No other significant difference exists between the other source handover 1820 and the external source handover 1220 (FIG. 12).

Similarly, no significant differences, except for the absence of the OSMs 1-2 data flow (312) exist between the other sink handover 1810 and the external sink handover 1210 (FIG. 12). A very similar statement can be made about the overlapped link time estimator 1830. Functionally, no significant differences exist between the overlapped link time estimator 1830 and the link time estimator 1230 (FIG. 12). However, link time estimation between sensor 1 and sensor 2 is not computed since the FOVs of these two sensors overlap.

Analyze Wide Area Flow 340

Figure 19:
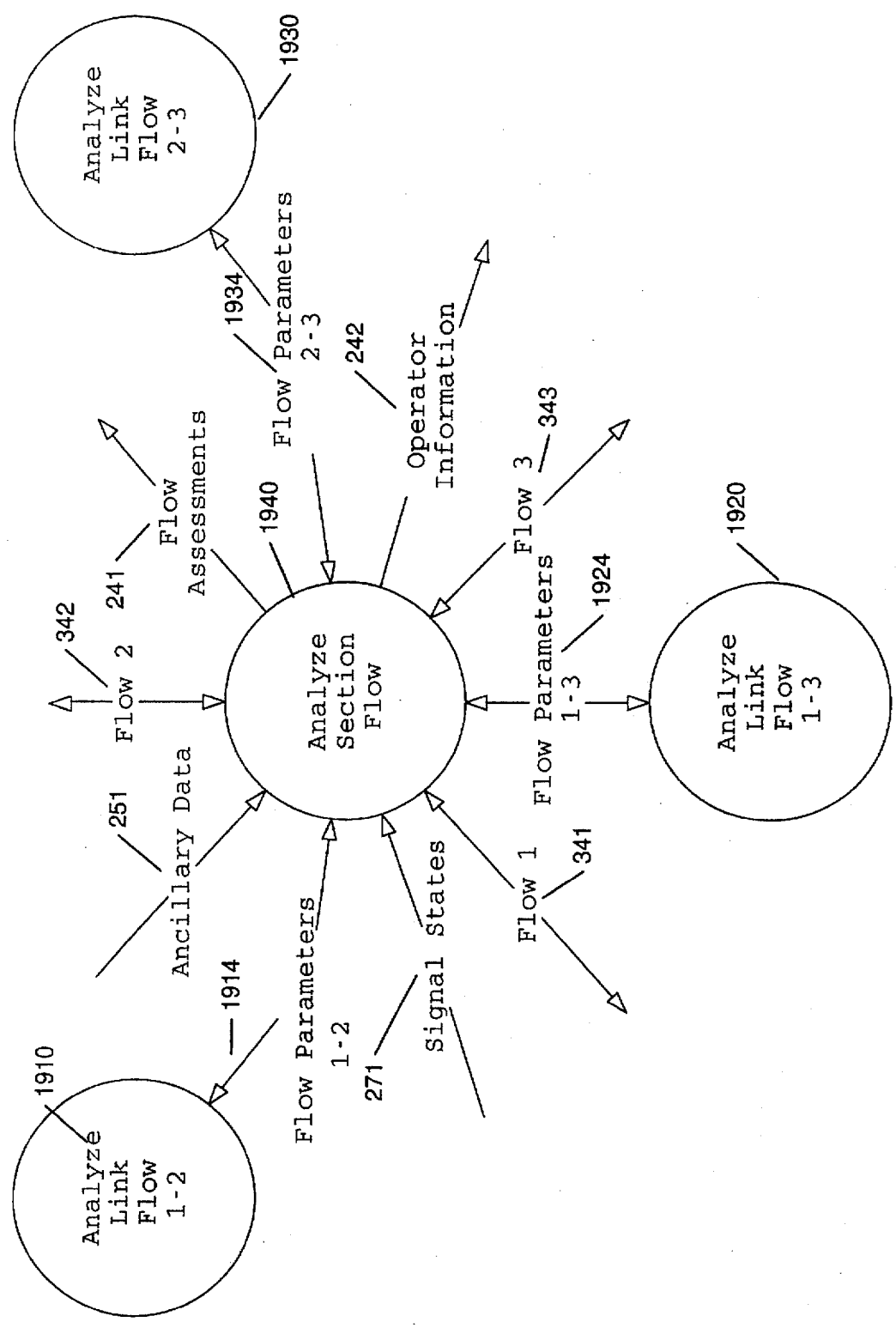
FIG. 19 is a data flow diagram of an analyze wide area flow process of the MATS of FIG. 3.

Referring now to FIG. 19, there is shown a data flow diagram of the analyze wide area flow process 340, which corresponds to the top MATS layer 140. A division is made between analysis of links that occurs between sensors, and analysis of sections of roadway including the links. For example, an analyze link flow 1-3 process 1910 provides flow analysis of the link between sensor 1 and sensor 3; similarly an analyze link flow 2-3 process 1930 provides the analysis of the link flow between sensor 2 and sensor 3. Thus flow analysis of links is partitioned geographically which simplifies interfaces and reduces system integration problems. An analyze section flow process 1940 provides data interchange between the plural link flow analysis components 1910, 1920, 1930. For example, a flow parameters 1-2 data flow 1914 provides data to flow analysis of the link between sensor 1 and sensor 2.

At a higher level, the analyze section flow process 1940 provides network-wide analysis of the roadway's sections. Partitioning links from roadway sections is done since links could require a relatively simple flow model due to short distance between sensors, hence reducing complexity. On the other hand, numerous sensors might be used to monitor a large section of roadway, requiring a complex flow model.

Flow information from the tracking nodes flows 341, 342 and 343 enters the analyze wide area flow process as Flow 1, Flow 2 and Flow 3 corresponding to tracking node 1 (310), tracking node 2 (320), and tracking node 3 (330). Flow information developed by the tracking nodes is situation dependent but could include statistics such as the average velocity in each lane, the vehicle densities on each lane, the link time estimate on links leading to the tracking node, and the percentage of trucks in each lane. Flow 1 contains flow statistics developed locally within the sensor 1 FOV, etc.

The analyze link flow 1-3 process 1920 communicates at the network-wide level represented by the analyze section flow process 1940 through the flow parameters 1-3 data flow 1924. The flow parameters 1-3 data flow 1924 also carries any ancillary data 251 or Signal State 271 information needed to model and characterize the flow on a particular link. This information is developed in the analyze section flow process 1940. Similarly, flow data developed at the analyze link flow level is communicated as flow parameters back to the analyze section flow process 1940. This data is utilized in the section models of the analyze section flow process 1940 to develop both operator information and flow assessments for area signal control 270. Flow parameters from the analyze link flow processes 1910, 1920, 1930 to the analyze section flow process 1940 could include lane capacity estimates, traffic incidents detected, and percentage of vehicles leaving one sensor site and arriving at the other sensor site.

Analyze Link Flow 1-3 1920

Figure 20:
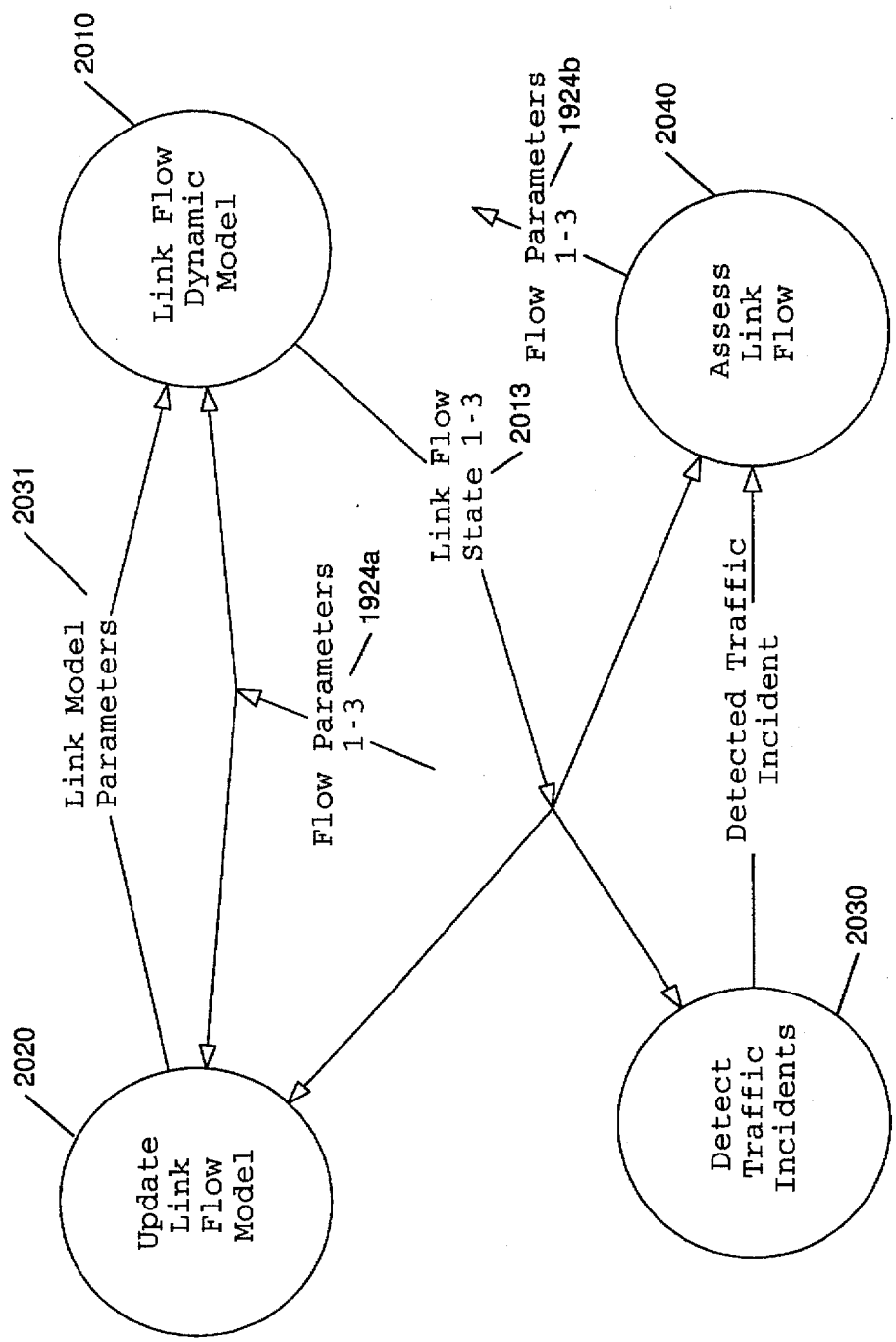
FIG. 20 is a data flow diagram of an analyze link flow process of the analyze wide area flow process of FIG. 19.

Referring now to FIG. 20, there is shown a data flow diagram of the analyze link flow 1-2 process 1910. Note that the analyze link flow 2-3 process 1930 and the analyze link flow 1-3 process 1910 have analogous functions to those included in the analyze link flow 1-2 process 1910, and therefore only the analyze link flow 1-2 process 1910 will be described.

The design of the analyze link flow 1-2 process 1910 is based on on-line dynamic modeling. A dynamic parametric model is formulated for the link flow, captured in a link flow dynamic model 2010, and the model's parameters are adjusted on-line until the model 2010 matches the data in the flow parameters 1-2 data flow 1914a. An update link flow model process 2020 updates the link flow model through on-line tuning or adjustment of the model's parameters so that the model is kept consistent with the measured data. Data developed in tracking node 1 (310) and tracking node 2 (320) are utilized to tune the model. The update link flow model process 2020 monitors in real time the state of the link flow model 2010 on a link flow state 1–2 data flow 2013 and tunes the link model parameters so that the flow characteristics embodied in the link flow state 1–2 data flow 2013 closely correspond to the local flow information extracted by tracking node 2 (320) and tracking node 3 (330).

A number of well-known methods and algorithms exist in the literature for model tuning. Several are described in P. Maybeck, *Stochastic models, estimation, and control;* 1979; Academic Press; NY, N.Y.; Chapters 9, 10, and 12 of Volume 2 which is incorporated herein by reference. A common method uses an extended Kalman filter. Model parameters in the link flow dynamic model 2010 are included in the state variables. An extended Kalman filter implemented in the update link flow model process 2020 is used to estimate link flow model parameters.

For this example, the link flow state provides a representation of the flow within the link between sensor 1 FOV and sensor 2 FOV. Consequently, a detect traffic incidents process 2030 may detect flow disruptions or traffic incidents upon the link. The signal processing literature contains many well known algorithms well suited to implement the function of the detect traffic incidents process 2030. The detected traffic incident information is transferred to an assess link flow process 2040 along with the link flow state 1–2 for assessment. This assessment takes place in the asses link flow process 2040 and produces the flow parameters 1–2 communicated through the flow parameters data flow 1914b to the section level in the traffic flow analysis.

Analyze Section Flow 1940

Figure 21:
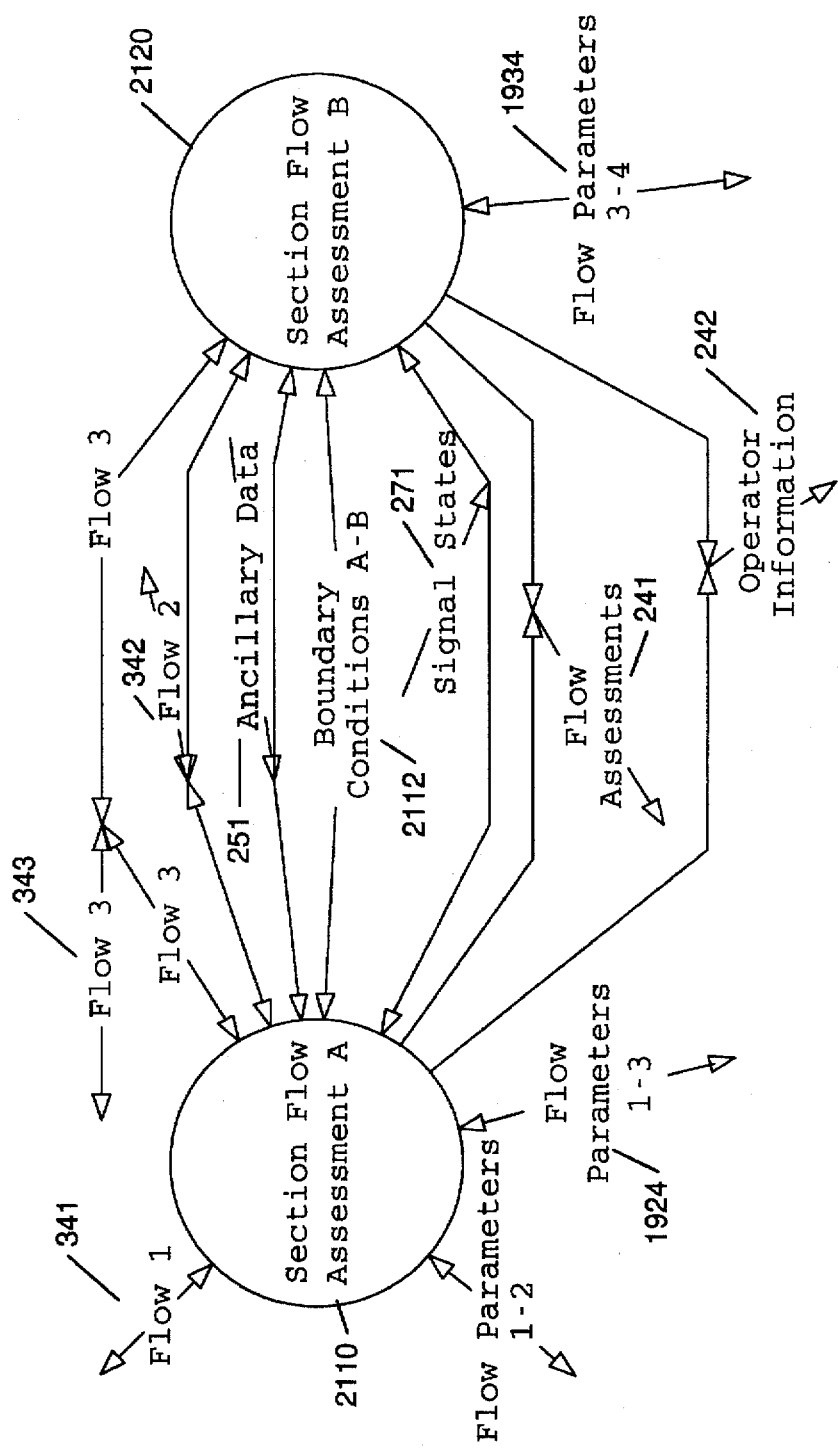
FIG. 21 is a data flow diagram of an analyze section flow process of the analyze wide area flow process of FIG. 19.

Referring now to FIG. 21, them is shown a data flow diagram of the analyze section flow process 1940. In particular, this figure shows that there is a function associated with each major section of the roadway. For example, consider a section of roadway containing sensor 1, sensor 2, and sensor 3, and consider this section to be separable from another section of roadway which folds back between sensor 3 and sensor 2. The important point here is that each major section of roadway will have a process associated with it in the analyze section flow process 1940. A section flow assessment A process 2110 corresponds to the first section and a section flow assessment B process 2120 corresponds to the other section in this example.

The section flow assessment A process 2110 for section A derives information from the link flow assessment between sensor 1 and sensor 2 on the flow parameters 1–2 data flow 1914 and from tracking node 1 (310), tracking node 2 (320), and tracking node 3 (330) on Flow 1 (341), Flow 2 (342), and Flow 3 (343) respectively. In summary, the section flow assessment A process 2110 interchanges data with the lower level functions. It operates on a macro level at the top MATS layer 140. Note also that the boundary conditions between section A and section B are interchanged on a boundary conditions A–B data flow 2112. This allows sections of roadways to be linked, allowing the system to be used on very large highways networks.

Section Flow Assessment A 2110

Figure 22:
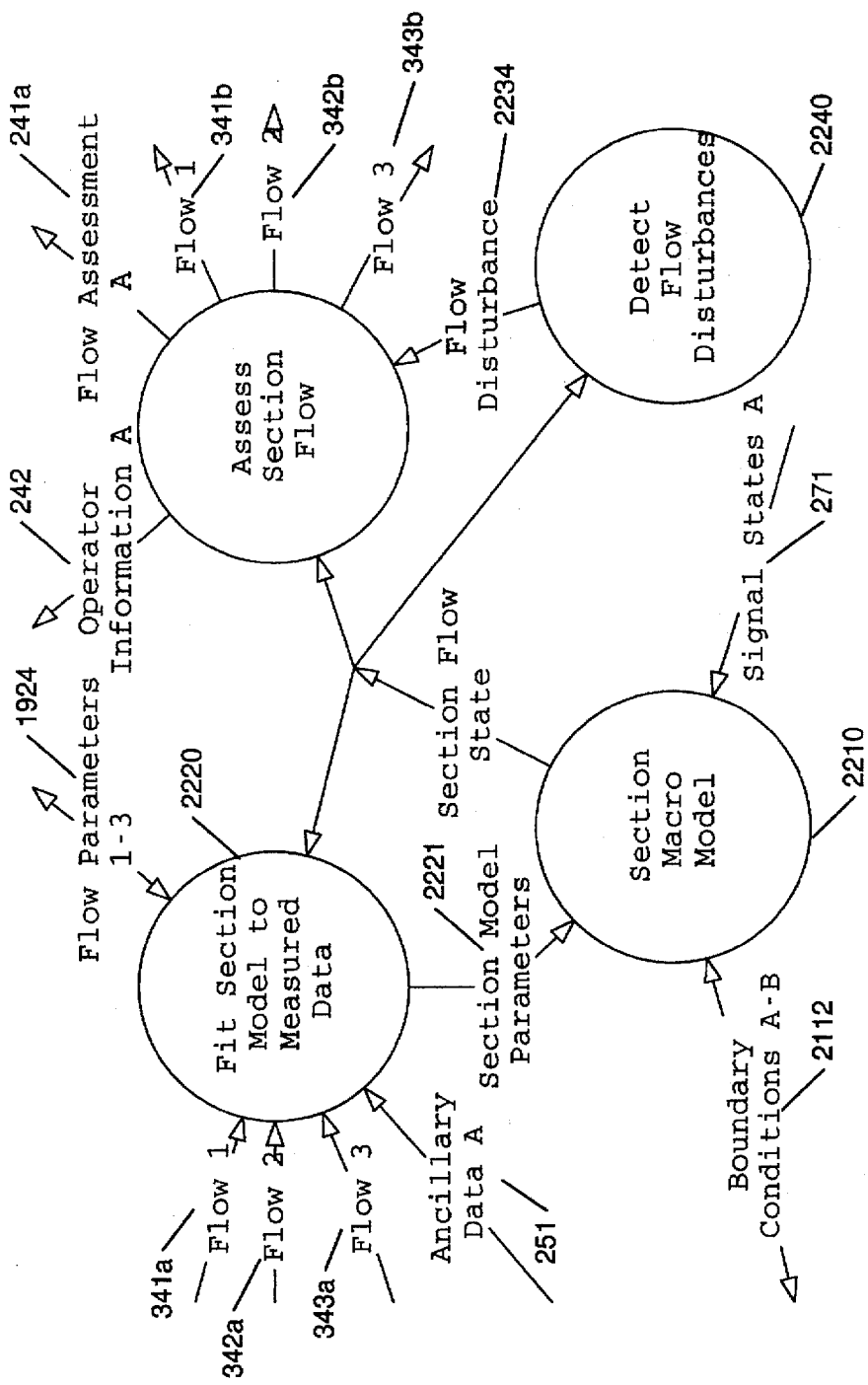
FIG. 22 is a data flow diagram of a section flow assessment process of the analyze section flow process of FIG. 21.

Referring now to FIG. 22, there is shown a data flow diagram of the section flow assessment A process 2110. All of the section flow assessment processes are identical. Therefore, only the section flow assessment A process 2110 is described. The section flow assessment A process includes: a fit section model to measured data process 2220, a section macro model process 2210, an assess section flow process 2230, and a detect flow disturbances process 2240.

The structure of the section flow assessment A process is very similar to the analyze link flow 1–2 process 1910 and FIG. 20. The primary difference between these two processes is the level of the flow model utilized. Link flow can typically use a simple model since the link between two closely spaced sensors is has a simpler flow model than the model needed to characteristics an entire section of roadway. The macro model for the section flow embedded in the section macro model process 2210 is often complex in order to handle the complexity of flow patterns along the entire section of roadway. A partial differential equation macro model is typical of flow models used in this process 2210.

Like the link flow dynamic model 2010, the section macro model 2210 is updated in real time through the fit section model to measured data process 2220. The fit section model to measured data process 2220 receives data transferred from the flow 1 data flow (341a), the flow 2 data flow (342a), the flow 3 data flow (343a), the ancillary data flow 251, and the flow parameters 1–3 data flow 1924. As with the update link flow model process 2020, the model parameters of the section flow assessment can be tuned by embedding them in the state variables and using an extended Kalman filter to tune the models parameters. These parameters are transferred through a section model parameters data flow 2221 to the section macro model process 2210. The section flow state is monitored for flow disturbances or incidents by the detect flow disturbances process 2240 which is similar to the detect traffic instances 2030. The parameterization and flags for flow disturbance are communicated to an assess section flow process 2230 on a flow disturbance data flow 2234. The assess section flow process 2230 performs the flow assessment function which extracts flow information required by the area signal control 270, the operator, and by the low layers of the processing structure. The assess section flow process 2230 generates data transferred to other process as described above through the operator information data flow 242 to the operator interface 260, the flow assessment data flow 241a to the area signal control 270, the flow 1 data flow 341b to tracking node 1, the flow 2 data flow 342b to tracking node 2, and the flow 3 data flow 343b to tracking node 3.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of surveilling vehicles in a traffic network, the network defining plural discrete sections and plural discrete fields, the sections comprising plural fields, wherein at least two discrete sections cover discrete fields of view connected to one another by a roadway link, the method comprising:

(a) a vehicle detection and flow assessment step comprising:

(1) for a given vehicle in the network, sensing the vehicle in at least one field, (2) determining the vehicle's position within the fields, and (3) characterizing the sensed vehicle based upon predefined attributes and assigning a unique identifier to the vehicle;

(b) a local tracking and flow assessment step comprising:
  (1) for a given vehicle from those sensed in the vehicle detection and flow assessment step, the vehicle having been determined to be in a first particular field, at a particular position, and having a unique identifier, tracking the vehicle through the field,
  (2) estimating the time required for the vehicle to travel from the first field to a second field, and
  (3) associating the identifier of the vehicle with the detection of the vehicle in the second field, the vehicle having been detected in the second field in the vehicle detection and flow assessment step;
  (4) characterizing the flow of all sensed vehicles within a given field; and (c) an area wide flow characterization step comprising:
  (1) estimating a state of traffic flow over a section of the network,
  (2) detecting flow disruptions based upon the state of traffic flow, and
  (3) characterizing flow over the section.

2. A method of surveilling a vehicle having a fingerprint in a wide area traffic network comprising:
  detecting a vehicle's entry into the network at a location in the network with a passive sensor;
  identifying the vehicle's fingerprint;
  tracking the vehicle's flow through the network by comparing vehicle fingerprints at various times and at non-contiguous locations using a plurality of sensors wherein at least two of said sensors have non-overlapping fields of view; and
  generating a correlation matrix of selected vehicle origination locations in the network and selected vehicle destination locations in the network.

3. A sensor system comprising a plurality of fingerprinting sensors, each said sensor defining a field and a local traffic processor coupled to the sensor, the sensor when activated providing raw signals to the local traffic processor, the raw signals including fingerprints of vehicles within the field, the vehicles each having a position, the local traffic processor when activated distinguishing the fingerprints, characterizing each sensed vehicle based upon predefined attributes within its fingerprint, and determining the position of each sensed vehicle within the field, wherein at least two of said plurality of sensors have non-overlapping fields of view.

4. A sensor system as set forth in claim 3, wherein the sensor comprises a video camera.

5. A traffic surveillance system comprising:
  a plurality of sensor systems, the sensor systems having non-overlapping fields of view, each said sensor system comprising a fingerprinting sensor defining a field and a local traffic processor coupled to the sensor, the sensor when activated providing raw signals to the local traffic processor, the raw signals including fingerprints of vehicles within the field, the vehicles each having a position, the local traffic processor when activated distinguishing individual vehicles based upon their respective fingerprints, reducing the fingerprints to characterizations of predefined attributes, and determining the position of each distinguished vehicle within the field; and
  a wide area traffic flow processor coupled to the local traffic processors, the wide area traffic flow processor adapted to track movement of a vehicle through a given sensor's field and from the given sensor's field of view into a non-overlapping field of view of a second sensor, through correlation of characterized attributes and determined locations where one location is at least 200 feet from another location.

6. A traffic surveillance system as set forth in claim 5, wherein the sensor comprises a video camera.

7. A traffic surveillance system as set forth in claim 5, wherein the wide area traffic processor is further programmed to characterize flow within each sensor's field, associate vehicles from one sensor to another, compute travel time between predefined points for a particular vehicle identified by two or more local traffic processors, and estimate average link time between sensors.

8. A traffic surveillance system as set forth in claim 5, the wide area traffic flow processor further programmed to estimate flow over sections of a roadway within the fields of the sensors.

9. A traffic surveillance system for surveilling vehicles in a traffic network, the traffic network defining plural discrete, widely spaced-apart sections and plural discrete fields, the sections comprising plural fields, the traffic surveillance system comprising:

(a) a vehicle detection and flow assessment layer comprising:
  (1) a plurality of fingerprinting sensors each having a range of at least one field and,
  (2) a plurality of local traffic processors each coupled to at least one of the sensors and adapted to determine vehicle positions within the range of the sensors, uniquely characterize sensed vehicles based upon predefined attributes, and assign a unique identifier to each sensed vehicle;

(b) a local tracking and flow assessment layer coupled to the vehicle detection and flow assessment layer and comprising:
  (1) means for tracking vehicles sensed by the vehicle detection and flow assessment layer through the fields in which the vehicles were sensed,
  (2) means for correlating vehicle identifiers produced in different local traffic processors,
  (3) means for estimating vehicle travel time between fields, and
  (4) means for characterizing the flow of all sensed vehicles within a given field;

(c) an area wide flow characterization layer comprising:
  (1) means for estimating traffic flow over a given section of the network,
  (2) means for detecting flow disruptions based upon the traffic flow, and
  (3) means for characterizing flow over the given section.

10. A traffic surveillance system comprising:
  a plurality of sensor systems, where at least two of said sensor systems are separated from one another by a roadway link, the sensor systems each comprising a fingerprinting sensor defining a field and a local traffic processor coupled to the sensor, the sensor when activated providing raw signals to the local traffic processor, the raw signals including fingerprints of vehicles within the field, the vehicles each having a position, the local traffic processor when activated uniquely distinguishing individual vehicles based upon their respective fingerprints, reducing the fingerprints to characterizations of predefined attributes, and determining the position of each distinguished vehicle within the field; and a wide area traffic flow processor coupled to the local traffic processors, the wide area traffic flow processor comprising a programmed computer having a program and thereby operable to associate vehicles from a first sensor to a second sensor having a non-overlapping field of view with the first sensor, and connected to said first sensor via a roadway link, and compute travel time between predefined points for a particular vehicle identified by two or more local traffic processors.

11. A traffic surveillance system comprising:

a plurality of sensor systems, the sensor systems each comprising a fingerprinting sensor observing a field and a local traffic processor coupled to the sensor, the sensor when activated providing raw signals to the local traffic processor, the raw signals including fingerprints of vehicles within the field, the vehicles each having a position, the local traffic processor when activated distinguishing individual vehicles based upon their respective fingerprints, reducing the fingerprints to characterizations of predefined attributes, and determining the position of each distinguished vehicle within the field; and a wide area traffic flow processor coupled to the local traffic processors, the wide area traffic flow processor comprising a programmed computer having a program and thereby operable to associate vehicles from a first sensor observing a first field of view to a second sensor observing a second field of view, said second field of view being non-overlapping with said first field of view, and estimate average travel time between sensors.

12. A sensor system comprising a first passive, fixed sensor having a first field and a first local traffic processor coupled to the first sensor, the first sensor when activated providing raw signals to the first local traffic processor, the raw signals including fingerprints of vehicles within the first field, the vehicles each having a position, the first local traffic processor when activated distinguishing the fingerprints, characterizing each sensed vehicle based upon predefined attributes within its fingerprint, and determining the position of each sensed vehicle within the first field, and a second passive, fixed sensor having a second field and a second local traffic processor coupled to the second sensor, the second sensor when activated providing raw signals to the second local traffic processor, the raw signals including fingerprints of vehicles within the second field, the vehicles each having a position, the second local traffic processor when activated distinguishing the fingerprints, characterizing each sensed vehicle based upon predefined attributes within its fingerprint, and determining the position of each sensed vehicle within the second field, wherein said first field and said second field are non-overlapping.

13. A traffic surveillance system for surveying a wide area of traffic, said system comprising:

(a) a first video sensor system, said first video sensor system having a range of at least a first field of view, and being able to detect and identify a given vehicle present in said first field of view, and transmit a first signal concerning said given vehicle;

(b) a second video sensor system, said second video sensor system having a range of at least a second field of view and being able to detect and identify said given vehicle present in said second field of view and transmit a second signal concerning said given vehicle wherein a roadway link connects said first video sensor system with said second video sensor system; and (c) a wide area flow processor capable of receiving said first signal and said second signal and recognizing and tracking movement of said given vehicle from said first video sensor system's field of view through said second video sensor system's field of view.

14. A traffic surveillance system as set forth in claim 13, wherein said first video sensor system determines a first position of said given vehicle in said first field of view and said second video sensor system determines a second position of said given vehicle in said second field of view.

15. A traffic surveillance system as set forth in claim 13, wherein said second field of view is non-contiguous with said first field of view.

16. A traffic surveillance system as set forth in claim 15, wherein said second field of view is located at a distance of greater than 200 feet from said first field of view.

17. A traffic surveillance system as set forth in claim 15, wherein said second field of view is located at a distance of greater than one fourth mile from said first field of view.

18. A traffic surveillance system as set forth in claim 13, wherein said first video sensor system comprises:

(a) a first video sensor capable of sensing characteristics of said given vehicle, said characteristics being adequate to identify said given vehicle, and providing a first data signal containing therein characterizing data concerning said given vehicle; and (b) a first traffic processor coupled to said first video sensor, said first traffic processor receiving said first data signal and distinguishing said given vehicle from other vehicles based on said first data signal.

19. A traffic surveillance system as set forth in claim 18, wherein said first video sensor comprises a video camera.

20. A traffic surveillance system as set forth in claim 13, wherein said wide area flow processor utilizes a predictor algorithm to predict a future location for said given vehicle and uses location information concerning said given vehicle to correct said predictor algorithm.

21. A traffic surveillance system as set forth in claim 13, wherein said wide area of traffic comprises a traffic network of greater than one half mile in length.

22. A traffic surveillance system as set forth in claim 13, wherein said wide area of traffic comprises a traffic network of up to 50 miles in length.

23. A traffic surveillance system for surveying a wide area of traffic, said system comprising:

(a) a first sensor system, said first sensor system having a range of at least a first field, and being able to detect and identify a given vehicle present in said first field, and transmit a first signal concerning said given vehicle;

(b) a second sensor system, said second sensor system having a range of at least a second field and being able to detect and identify said given vehicle present in said second field and transmit a second signal concerning said given vehicle wherein a roadway link connects said first sensor system with said second sensor system; and (c) a wide area flow processor capable of receiving said first signal and said second signal and recognizing and tracking movement of said given vehicle from said first sensor system's field through said second sensor system's field.

24. A traffic surveillance system as set forth in claim 23, wherein said first sensor comprises an image processor, said image processor performing automated license plate reading.

25. A traffic surveillance system for surveying a wide area of traffic, said wide area of traffic comprising a traffic network of greater than one half mile in length, said traffic surveillance system comprising:

(a) a first video sensor system, said first video sensor system having a range of at least a first field of view, and being able to detect and uniquely identify a given vehicle present in said first field of view, and transmit a first signal concerning said given vehicle, and said first video sensor system determining a first position of said given vehicle in said first field of view, and wherein said first video sensor system comprises:
  (i) a first video sensor capable of sensing characteristics of said given vehicle, said characteristics being adequate to uniquely identify said vehicle, and providing a first data signal containing therein characterizing data concerning said given vehicle; and
  (ii) a first traffic processor coupled to said first video sensor, said first traffic processor receiving said first data signal and uniquely distinguishing said given vehicle from other vehicles based on said first data signal;

(b) a second video sensor system, said second video sensor system having a range of at least a second field of view, said first field of view being non-contiguous with said second field of view, and said second video sensor system being able to detect and uniquely identify said given vehicle present in said second field of view and transmit a second signal concerning said given vehicle, and said second video sensor system determining a second position of said given vehicle in said second field of view wherein a roadway link connects said first video sensor system with said second video sensor system; and (c) a wide area flow processor capable of receiving said first signal and said second signal and recognizing and tracking movement of said given vehicle from said first video sensor system's field of view through said second video sensor system's field of view.

* * * * *